United States Patent
Duyen Nguyen et al.

(10) Patent No.: US 12,425,184 B1
(45) Date of Patent: Sep. 23, 2025

(54) COMPUTER-IMPLEMENTED METHOD FOR DETERMINING A FREQUENCY CONTENT OF AN ENCRYPTED RAW AUDIO SIGNAL

(71) Applicant: CALLYOPE, Neuilly-sur-Seine (FR)

(72) Inventors: Tu Duyen Nguyen, Neuilly-sur-Seine (FR); Adrien Lesage, Neuilly-sur-Seine (FR); Clotilde Cantini, Neuilly-sur-Seine (FR); Rachid Riad, Neuilly-sur-Seine (FR)

(73) Assignee: CALLYOPE, Neuilly-sur-Seine (FR)

( * ) Notice: Subject to any disclaimer, the term of this patent is extended or adjusted under 35 U.S.C. 154(b) by 0 days.

(21) Appl. No.: 18/941,347

(22) Filed: Nov. 8, 2024

(51) Int. Cl.
| | |
|---|---|
| *H04L 9/00* | (2022.01) |
| *G10L 15/08* | (2006.01) |
| *G10L 19/002* | (2013.01) |
| *G10L 19/032* | (2013.01) |
| *G10L 25/18* | (2013.01) |
| *G10L 25/24* | (2013.01) |

(52) U.S. Cl.
CPC .............. *H04L 9/008* (2013.01); *G10L 15/08* (2013.01); *G10L 19/002* (2013.01); *G10L 19/032* (2013.01); *G10L 25/18* (2013.01); *G10L 25/24* (2013.01)

(58) Field of Classification Search
CPC ....... H04L 9/008; G10L 15/08; G10L 19/002; G10L 19/032; G10L 25/18; G10L 25/24
See application file for complete search history.

(56) References Cited

U.S. PATENT DOCUMENTS

| | | | | |
|---|---|---|---|---|
| 6,037,898 A | * | 3/2000 | Parish | H04W 24/00 342/174 |
| 2023/0368019 A1 | * | 11/2023 | Son | G06N 3/0455 |

FOREIGN PATENT DOCUMENTS

| | | | | | |
|---|---|---|---|---|---|
| CN | 101520894 B | * | 3/2011 | | |
| CN | 109543821 A | * | 3/2019 | ........... | G06N 3/0454 |
| CN | 112776650 A | * | 5/2021 | .............. | B60L 53/62 |
| CN | 113743001 A | * | 12/2021 | ............. | G06F 30/27 |
| CN | 114726498 A | * | 7/2022 | ............. | G06N 3/045 |
| CN | 114764936 A | * | 7/2022 | | |

(Continued)

OTHER PUBLICATIONS

Pathak et al., "Privacy Preserving Probabilistic Inference with Hidden Markov Models", International Conference on Acoustics Speech and Signal Processing (ICASSP), Mitsubishi Electric Research Laboratories, Inc., TR2011-017, May 2011, 6 pages.

(Continued)

*Primary Examiner* — Meng Li
(74) *Attorney, Agent, or Firm* — Maier & Maier, PLLC

(57) ABSTRACT

A computer-implemented method for determining a frequency content of an encrypted raw audio signal obtained from a preliminary application of an encryption function E to a raw audio signal x, the method including: quantizing an encrypted raw audio signal, so as to obtain a quantized input signal; for each convolution kernel function among at least one convolution kernel function, quantizing K weights, so as to generate at least one quantized convolution kernel function; compiling the at least one quantized convolution kernel function in a homomorphic encryption environment so as to obtain at least one private quantized kernel function; applying the at least one private quantized kernel function to the quantized input signal.

20 Claims, 12 Drawing Sheets

(56) References Cited

FOREIGN PATENT DOCUMENTS

CN 116863936 A * 10/2023
WO WO-2025020680 A1 * 1/2025 ............. G06V 10/26

OTHER PUBLICATIONS

Chillotti et al., "TFHE: Fast Fully Homomorphic Encryption Over the Torus", Journal of Cryptology, HAL Open Science, HAL Id: hal-03993063, 2020, vol. 33, No. 1, 63 pages.
Thaine et al., "Extracting Mel-Frequency and Bark-Frequency Cepstral Coefficients from Encrypted Signals", Interspeech 2019, ISCA, Sep. 15-19, 2019, Graz, Austria, 5 pages.
Zhang et al., "Encrypted Speech Recognition Using Deep Polynomial Networks", arXiv:1905.05605v1, May 11, 2019, 5 pages.
Riad et al., "Vocal Markers from Sustained Phonation in Huntington's Disease", arXiv:2006.05365v3, Jul. 31, 2020, 6 pages.
Cheon et al., "Homomorphic Encryption for Arithmetic of Approximate Numbers", Seoul National University, Republic of Korea, snu.ac.kr, University of California, San Diego, mrkim@ucsd.edu, ISBN: 978-3-319-7693-1, Nov. 2017, 23 pages.
Glackin et al., "Privacy Preserving Encrypted Phonetic Search of Speech Data", IEEE International Conference on Acoustics, Speech, and Signal Processing, ICASSP 2017—Proceedings, Institute of Electrical and Electronics Engineers Inc., Queen's University Belfast, IEEE. 2017, 6 pages.

* cited by examiner

COMPUTER-IMPLEMENTED METHOD FOR DETERMINING A FREQUENCY CONTENT OF AN ENCRYPTED RAW AUDIO SIGNAL

FIELD

The present invention relates to the field of audio and speech data processing with privacy preservation.

More precisely, the invention concerns a computer-implemented method for determining a frequency content of an encrypted raw audio signal to solve a computational task.

BACKGROUND

The number of audio-listening devices has surged thanks to the increasing affordability of smart speakers, headphones, and even TVs, putting high-fidelity audio capture technology in the hands of consumers at ever-lower costs. This trend, while allowing easy access to smart agents through audio channels, has consequences for user privacy.

Human speech signal conveys sensitive information beyond linguistic content about the speaker's traits and current state. Automatic speech systems have been developed to recognize personal traits such as age, gender, height, current emotions, mood states in psychiatric diseases, or even current pain. The increasing prevalence of devices equipped with microphones expands the possibilities for adversaries to capture speaker information. This proliferation of devices can be seen through the lens of the cryptography principle known as the "surface attack" theory. A larger attack surface—the total number of potential entry points for adversaries—implies a larger number of vulnerabilities.

This ever-growing attack surface on human speech calls for the development and deployment of machine learning and speech technologies to preserve the privacy of speakers. Given the sensitivity of speech data, individuals may wish to protect both their voice identity and the content of their utterances. Such privacy concerns are often reinforced by legal frameworks like the EU's GDPR, which mandate the protection of personal data. This is even more critical in healthcare settings, where speech analysis is gaining traction in neurology and psychiatry, often through applications developed by private companies. Privacy-preserving techniques must be implemented throughout the entire machine learning pipeline to ensure full protection of individuals' speech. This includes protecting speech data during training data collection, model inference (prediction), and even potential privacy breaches by cloud vendors and healthcare companies hosting and carrying machine learning analyses.

While existing methods like differential privacy, speech anonymization, and federated learning aim to protect training speaker data, they have some limitations and do not protect data used during deployment and inference. These techniques will decrease potential leakages of the training data, by reducing speaker footprints on spoken utterances; or leaving training data on mobile smartphones, and computing some gradients on the client side.

These approaches present some limitations. First, they can conflict with biometric or clinical speech applications. For example, deleting speaker characteristics like pitch or speech rate can hinder tasks like emotion recognition or disease severity estimation. Second, these methods still have security risks. Storing model weights on mobile devices exposes training data participants to membership inference attacks and even potential data reconstruction.

One goal of the invention is to improve the situation.

SUMMARY

This invention thus relates to a computer-implemented method for determining a frequency content of an encrypted raw audio signal obtained from a preliminary application of an encryption function to a raw audio signal, said method comprising:
  obtaining (e.g., receiving) the encrypted raw audio signal;
  obtaining at least one convolution kernel function, each convolution kernel function comprising K weights and corresponding to a couple composed of (i.e., comprising) a temporal bin and a frequency bin;
  quantizing said encrypted raw audio signal, so as to obtain a quantized input signal;
  for each convolution kernel function among said at least one convolution kernel function, quantizing said K weights, so as to generate at least one quantized convolution kernel function;
  compiling said at least one quantized convolution kernel function in a homomorphic encryption environment so as to obtain at least one private quantized kernel function;
  applying said at least one private quantized kernel function to said quantized input signal so as to determine an encrypted frequency content comprising, for each couple of said temporal bin and said frequency bin, the Fourier transform at said frequency bin of a portion of said quantized input signal corresponding to a temporal window comprising said time bin,
  applying an inverse decryption function of said encryption function to said encrypted frequency content, so as to obtain said frequency content of said encrypted raw audio signal.

Advantageously, the method according to the invention allows obtaining a frequency spectrum of an audio signal without accessing the clear content of this audio signal. Rather, an encrypted version of the audio signal is processed. Here, a homomorphic encryption environment is, advantageously and for the first time, leveraged in the field of audio signals processing. Several applications of the method can be foreseen. One example lies in the field of medical monitoring where the patient health status is assessed through an analysis of samples of his or her voice. The method presented here allows performing such an analysis remotely, from a server, while keeping the privacy in an end-to-end manner of the patient voice samples.

In some embodiments, the at least one convolution kernel function comprises a first convolution kernel function and a second convolution kernel function, the first convolution kernel function corresponding to a first temporal bin and a first frequency bin, and the second convolution kernel function corresponding to a second temporal bin and a second frequency bin, the first temporal bin being different from the second temporal bin.

In some embodiments, the at least one convolution kernel function further comprises a third convolution kernel function and a fourth convolution kernel function, the third convolution kernel function corresponding to a third temporal bin and a third frequency bin, and the fourth convolution kernel function corresponding to a fourth temporal bin and a fourth frequency bin, the third frequency bin being different from the fourth frequency bin.

According to some embodiments, the method further comprises, before compiling said at least one quantized convolution kernel function:

obtaining an effective bit budget from said step of quantizing the encrypted raw audio signal and the step of quantizing the K weights;

comparing the effective bit budget to a target bit budget;

if the effective bit budget exceeds the target bit budget, reiterating the step of quantizing the encrypted raw audio signal and the step of quantizing the K weights until the effective bit budget is less or equal to the target bit budget.

By bit budget, it is meant a total number of bits that can be used for the computations on a specific hardware or within a specific computation environment.

Advantageously, checking the total number of bits used for the computations allows respecting some constraints imposed by some encryption environments. Indeed, some environments impose a limit bit budget. Imposing a checking step allows assessing the meeting of this limit bit budget.

In some embodiments, a set of bit width parameters are optimized while reiterating the step of quantizing the encrypted raw audio signal and the step of quantizing the K weights. For instance, the set of bit width parameters can comprise an input bit width parameter, an output bit width parameter, a weight bit width parameter, and intermediary bit widths parameters. An optimization criterion may be defined based on the set of bit width parameters, pertaining to the fidelity of the encrypted frequency spectrum with respect to its clear counterpart (i.e., the frequency content determined directly from the clear raw audio signal).

Hence, optimizing such a set of bit width parameters allows adjusting the quality of the encrypted frequency content.

According to some embodiments, the method further comprises, at the step of quantizing the encrypted raw audio signal, setting an input bit width parameter, i.e. a bit width for the quantization, less than a first predefined threshold.

According to some embodiments, the method further comprises, at the step of quantizing, for each convolution kernel function, the K weights, setting a weight bit parameter, i.e. a bit width for the quantization, less than a second predefined threshold.

According to some embodiments: for each convolution kernel function, each weight is a product of a periodic function of the frequency bin with a window function of the temporal bin.

This definition of the weights allows obtaining, for each convolution kernel function, the short time Fourier transform of the quantized input signal evaluated at the temporal bin and the frequency bin.

In some embodiments, the method further comprises:

computing an audio descriptor of said frequency content.

By audio descriptor of the frequency content, it is meant a quantity representative of a characteristic of the frequency content.

Audio descriptors are used for instance in the field of medical diagnostics or medical monitoring. For instance, the technique of sustained phonation can be used to deduce audio descriptors and detect some disorders, such as Huntington's Disease or psychiatric diseases, as in "Vocal markers from sustained phonation in Huntington's Disease" by Riad, R. et al., Audio descriptors can also allow on one hand statistical science for group comparison and on the other hand machine learning for prediction of status of individuals.

In some embodiments, the audio descriptor is a statistical moment of said frequency content.

In some embodiments, the method further comprises:

obtaining a previously trained model configured for classification of audio signals into one class among a plurality of classes, passing the encrypted frequency spectrum through said previously trained model so as to obtain a class of said encrypted frequency spectrum.

Advantageously, the method according to the invention allows performing classification of the encrypted raw audio signal, which can have several applications, such as in the field of health monitoring.

In some embodiment, the method further comprises setting weights of at least some of the at least one convolution kernel function to zero. In other words, the method further comprises introducing zeros in the weights of at least some of the at least one convolution kernel function.

In some embodiments, the method further comprises, for each convolution kernel function, keeping every d weight, where d is an integer higher or equal to 1, and setting other weights to zero.

This parameterization of the weights of the at least one convolution kernel function advantageously constitutes an approximation allowing reducing the bit budget involved in the homomorphic encryption environment while keeping acceptable precision of the determined frequency content.

In some embodiments, said quantized input signal is a temporal sequence of N audio data, N being an integer, and for each couple composed of a time bin m and a frequency bin k among said at least one couple, d is smaller than $$\frac{N}{2(k+1)}.$$

Advantageously, when the sampling rate d is less than this value, the Shannon-Nyquist sampling theorem is satisfied.

In some embodiments, for each couple composed of a temporal bin m and a frequency bin k, said window function w has a length depending said frequency bin k.

Making the length of the window function dependent on the frequency bin translates into setting to zero some of the weights and constitutes an additional approximation allowing reducing the bit budget involved in the homomorphic encryption environment while keeping acceptable precision of the determined frequency content.

In some embodiments, the periodic function is a projection of the complex exponential function on an ensemble of L equidistant numbers on the unit circle, where L is an integer.

Constraining the periodic function to take a value among a limited number of L numbers translates into setting to zero some of the weights and constitutes an additional approximation allowing reducing the bit budget involved in the homomorphic encryption environment while keeping acceptable precision of the determined frequency content.

In some embodiments, for each convolution kernel function, each weight depends on an index n comprised between 0 and K−1, the method further comprising setting weights corresponding to an index n greater than $N_{min}$ and less that $N_{max}$ to zero.

Getting rid of the weights outside a predetermined range of value translates into setting to zero those weights and constitutes an additional approximation allowing reducing the bit budget involved in the homomorphic encryption environment while keeping acceptable precision of the determined frequency content.

In some embodiments, the raw audio signal comprises speech data from at least one subject.

This corresponds to application where the utterances of a subject have to be analyzed while remaining private. An example of application lies in the field of health monitoring, where diagnosis or diseases evolution predictions have to be performed based on an analysis of speech data of a patient and where the privacy of those data need be kept.

In some embodiments, the method further comprises applying a Mel filterbank to at least one temporal slice of said encrypted frequency content and corresponding to a given temporal bin so as to obtain at least one MelScale representation.

In some embodiments, the method further comprises determining Mel-Frequency Cepstral Coefficients (MFCC) from said at least one MelScale representation.

In some embodiments, the method further comprises applying a Gammatone filterbank to said encrypted frequency content.

In some embodiments, the method further comprises, based on the encrypted frequency content, determining a presence or an absence of a symptom of a disease. In other words, the method allows for diagnosing a disease.

For instance, the disease can be one among Alzheimer's disease, depression, schizophrenia, Parkinson's disease, bipolarity.

In some embodiments, the method further comprises, based on said encrypted frequency content, determining a severity degree of a disease. For instance, the severity degree can be determined between a low severity degree, a medium severity degree or a high severity degree.

For instance, a high severity degree of a disease may be that a characteristic of a symptom of the disease is higher than a predefined threshold. A low severity degree of a disease may be that a characteristic of a symptom of a disease is less than a predefined threshold. A medium severity degree may be that a characteristic of a symptom of the disease is comprised within a predefined range of values. The characteristic of the symptom may be a number of occurrences, an intensity, a frequency, a duration.

For instance, a high severity degree of a disease may be that a number of determined symptoms of the disease is higher than a predefined threshold. A low severity degree of a disease may be that a number of determined symptoms of the disease is less than a predefined threshold. A medium severity degree may be that a number of determined symptoms of the disease is comprised within a predefined range of values.

For instance, the disease can be one among Alzheimer's disease, depression, schizophrenia, Parkinson's disease, bipolarity.

The disclosure further pertains to a device for determining a frequency content of an encrypted raw audio signal obtained from a preliminary application of an encryption function to a raw audio signal, said device comprising:
at least one input configured to:
obtain said encrypted raw audio signal;
obtain at least one convolution kernel function, each convolution kernel function comprising K weights and corresponding to a couple composed of a temporal bin and a frequency bin;
at least one processor configured to:
quantize said encrypted raw audio signal, so as to obtain a quantized input signal;
for each convolution kernel function among said at least one convolution kernel function, quantize said K weights, so as to generate at least one quantized convolution kernel function;
compile said at least one quantized convolution kernel function in a homomorphic encryption environment so as to obtain at least one private quantized kernel function;
apply said at least one private quantized kernel function to said quantized input signal so as to determine an encrypted frequency content comprising, for each couple of said temporal bin m and said frequency bin, a Fourier transform at said frequency bin of a portion of the quantized input signal corresponding to a temporal window comprising said time bin,
at least one output configured to output the encrypted frequency content, wherein said device is configured to implement the method previously presented.

In some embodiments, the at least one processor is further configured to determine, based on the encrypted frequency content, a presence or an absence of a symptom of a disease.

By symptom, it is meant a physical or mental feature which is regarded as indicating a condition of disease. Symptoms of diseases determined from utterances or speech data, or physiological signal (e.g., heart beat, respiration or the like) of an individual comprise for instance spectral characteristics.

For instance, the disease can be a neuropsychiatric disorder among Alzheimer's disease, depression, schizophrenia, Parkinson's disease, bipolarity.

In some embodiments, the at least one processor is further configured to determine, based on the encrypted frequency content, a severity degree of a disease. For instance, the severity degree can be determined between a low severity degree, a medium severity degree or a high severity degree.

For instance, a high severity degree of a disease may be that a characteristic of a symptom of the disease is higher than a predefined threshold. A low severity degree of a disease may be that a characteristic of a symptom of a disease is less than a predefined threshold. A medium severity degree may be that a characteristic of a symptom of the disease is comprised within a predefined range of values. The characteristic of the symptom may be a number of occurrences, an intensity, a frequency, a duration.

For instance, a high severity degree of a disease may be that a number of determined symptoms of the disease is higher than a predefined threshold. A low severity degree of a disease may be that a number of determined symptoms of the disease is less than a predefined threshold. A medium severity degree may be that a number of determined symptoms of the disease is comprised within a predefined range of values.

For instance, the disease can be a neuropsychiatric disorder among Alzheimer's disease, depression, schizophrenia, Parkinson's disease, bipolarity.

All possible combinations of the previously described embodiments are part of the present disclosure.

In addition, the disclosure relates to a computer program product comprising instructions which, when the program is executed by a computer, cause the computer to carry out the methods compliant with any of the above execution modes.

The present disclosure further pertains to a computer-readable storage medium comprising instructions which, when executed by a computer, cause the computer to carry out the methods compliant with any of the above execution modes.

The present disclosure further relates to a non-transitory program storage device (i.e. computer-readable storage medium), readable by a computer, tangibly embodying a program of instructions executable by the computer to perform the computer-implemented methods, compliant with the present disclosure.

Such a non-transitory program storage device can be, without limitation, an electronic, magnetic, optical, electro-magnetic, infrared, or semiconductor device, or any suitable combination of the foregoing. It is to be appreciated that the following, while providing more specific examples, is merely an illustrative and not exhaustive listing as readily appreciated by one of ordinary skill in the art: a portable computer diskette, a hard disk, a ROM, an EPROM (Erasable Programmable ROM) or a Flash memory, a portable CD-ROM (Compact-Disc ROM).

DETAILED DESCRIPTION

Various methods are described herein, and each of the methods comprises one or more steps or actions for achieving the described method. Unless a specific order of steps or actions is required for proper operation of the method, the order and/or use of specific steps and/or actions may be modified or combined. Additionally, terms such as "first", "second", etc. may be used in various examples to modify an element, component, step, operation, etc., such as, for example, a "first quantizing" and a "second quantizing". Use of such terms does not imply an ordering to the modified operations unless specifically required. So, in this example, the first quantizing need not be performed before the second quantizing, and may occur, for example, before, during, or in an overlapping time period with the second quantizing.

Figure 1:
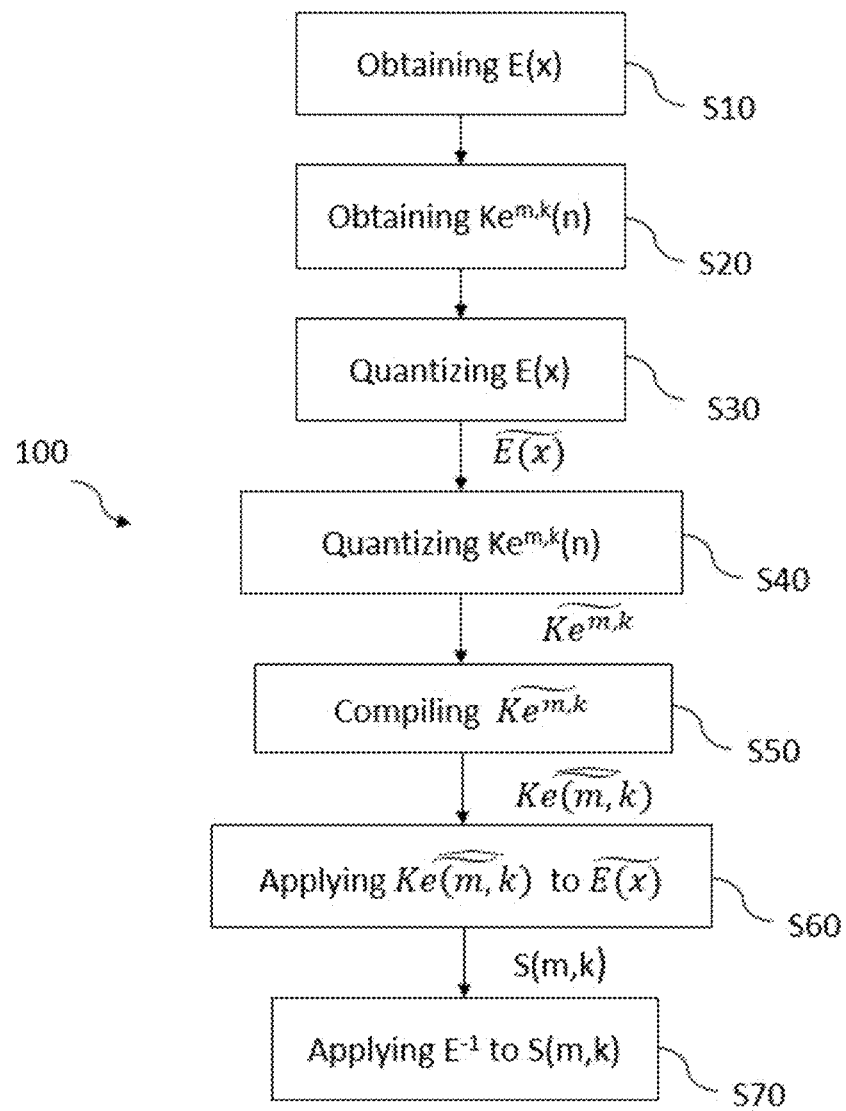
FIG. 1 is an example of a flow-chart representing a method for determining a frequency content of an encrypted raw audio signal obtained from a preliminary application of an encryption function to a raw audio signal according to some embodiments.

This invention relates to a computer-implemented method 100 for determining a frequency content of an encrypted raw audio signal obtained from a preliminary application of an encryption function to a raw audio signal x and illustrated on FIG. 1. The computer-implemented method 100 aims at enabling processing of audio signals while preserving the privacy of the content of the audio signals. The frequency content to be determined can be useful per se, or for further processing. For instance, other time-frequency representations of the audio signals under study may be computed from the determined frequency content. Alternatively, or as a complement, audio descriptors can be computed from the determined frequency content. Some embodiments of the method 100 will involve the use of an artificial neural network with fixed weights, i.e. not requiring any training phase for weights optimization.

Advantageously, the invention leverages the cryptographic approach known as homomorphic encryption to ensure the privacy of audio signals to be processed. Indeed, one way of performing computations securely is to operate on encrypted data, so that the client data is not at risk during inference.

A scheme is said to be fully homomorphic if it enables the evaluation of any function f over encrypted data. As a result, Fully Homomorphic Encryption (FHE) allows an individual A to compute any function f over some encrypted data $E(x)$ without accessing the plaintext, the data x, by using the FHE circuit equivalent $\hat{f}$ which operates over encrypted data, so that the result of the application of the function f is provided by:

$$f(x)=E^{-1}(\hat{f}[E(x)]).$$

Encryption of the raw audio signal before sending it to the server may unlock a broader range of privacy-preserving techniques. This approach not only protects the sensitive audio data but also safeguards the pipeline and models of service providers from unauthorized access or tampering.

Figure 2:
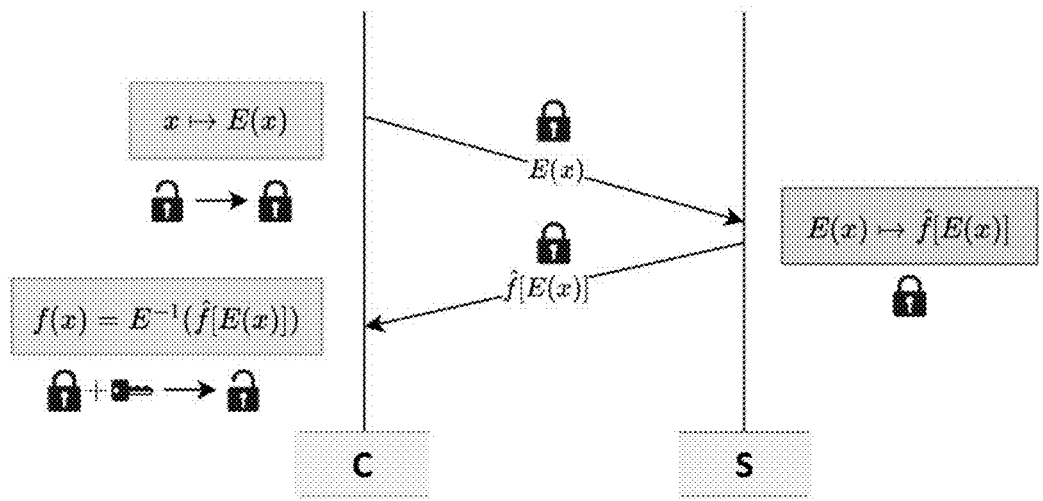
FIG. 2 illustrates schematically the principles of homomorphic encryption.

FIG. 2 schematically illustrates such an application of Fully Homomorphic Encryption (FHE) where clear data x need to be processed through a function f but with conserved privacy: in this application, the clear data x are encrypted with an encryption function E so as to obtain encrypted data E(x) on a client side C. Then, the encrypted data are sent to a server S, where they are processed by the FHE circuit equivalent $\hat{f}$. Afterwards, the result of this application $\hat{f}[E(x)]$ is sent back to the client C, where the clear result f(x) is obtained by decrypting the result $\hat{f}[E(x)]$ by application of the inverse decryption function $E^{-1}$.

In some embodiments, the raw audio signal comprises utterances or speech data, or physiological signal (e.g., heart beat, respiration or the like) from a person. Therefore, one feature of the method 100 is to work on an encrypted version of the raw audio signal.

Figure 3:
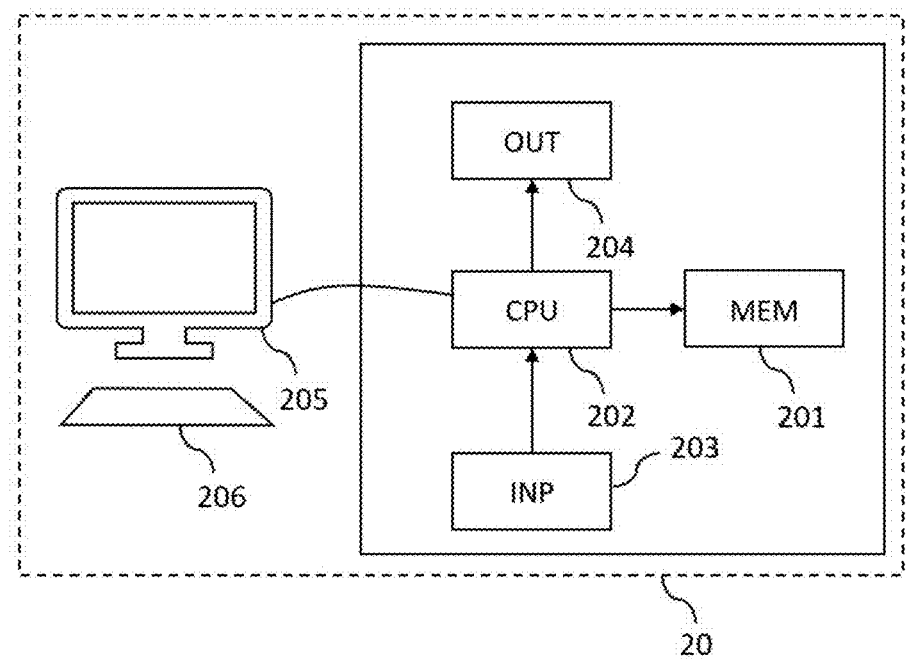
FIG. 3 illustrates a device for determining a frequency content of an encrypted raw audio signal obtained from a preliminary application of an encryption function to a raw audio signal according to some embodiments.

In some embodiments, at least some steps of the method 100 may be executed by a device 20 schematically illustrated on FIG. 3. The device 20 may be a server S as illustrated on FIG. 2.

In those embodiments, the device 20 comprises a computer, this computer comprising a memory 201 to store program instructions loadable into a circuit and adapted to cause a circuit 202 to carry out steps of the method of FIG. 1 when the program instructions are run by the circuit 202. The memory 201 may also store data and useful information for carrying steps of the present invention as described above.

The circuit 202 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for «Field-Programmable Gate Array»).

The computer may also comprise an input interface 203 for the reception of input data and an output interface 204 to provide output data. Examples of input data and output data will be provided further.

To ease the interaction with the computer, a screen 205 and a keyboard 206 may be provided and connected to the computer circuit 202.

The method 100 will be now described in reference to FIG. 1. FIG. 1 is a flowchart illustrating an example of steps to be executed to implement the method 100 for determining a frequency content of an encrypted raw audio signal E(x) obtained from a preliminary application of an encryption function to a raw audio signal x.

It is supposed that the raw audio signal x has been preliminarily encrypted by using an encryption function E, so as to obtain an encrypted raw audio signal E(x). For instance, the encryption function E may be based on an RSA algorithm, or a cosine number transformation, DNA coding, or chaotic systems.

In a step S10, the encrypted raw audio signal E(x) is obtained. In one example, obtained refers to fact that the encrypted raw audio signal E(x) is received from one or more local or remote database(s) wherein the encrypted raw audio signal E(x) have been previously stored. The latter can take the form of storage resources available from any kind of appropriate storage means, which can be notably a RAM or an EEPROM (Electrically-Erasable Programmable Read-Only Memory) such as a Flash memory, possibly within an SSD (Solid-State Disk).

In a step 20, at least one convolution kernel $Ke^{m,k}$ with K weights $Ke^{m,k}(n)$, n varying between 0 and K−1, is obtained (i.e., calculated).

Each convolution kernel $Ke^{m,k}$ among the at least one convolutional layer corresponds to a couple composed of a temporal bin m and a frequency bin k for which the frequency content will be determined.

It is recalled that a convolutional kernel function K(n) of length $F_L$ acts on an input signal x(i) in the following manner:

$$Z(i) = \sum_{n=0}^{F_L-1} x(n-i)K(n).$$

The equation is computed across all positions i in the input, generating the output convolution signal Z(i).

In some embodiments, for each convolution kernel function $Ke^{m,k}(n)$, each weight is a product of a periodic function of the frequency bin k with a window function w depending on the temporal bin m.

For instance, for a given couple of a temporal bin and a frequency bin (m,k), the weights are given by:

$$w(n-mh)e^{-2i\pi kn/N}$$

where h represents a convolution stride.

As a consequence, the result of the corresponding convolutional layer of the artificial neural network is given by:

$$X(m, k) = \sum_{n=0}^{M-1} x(n)w(n-mh)e^{-2i\pi kn}/N$$

With this definition for the weights, as will be seen further, the result provided by application of the convolution kernel function $Ke^{m,k}(n)$ to an input signal (i.e., raw audio signal x) is the Fourier transform (e.g., a short-time Fourier) of this input signal for the couple (m,k), using the window function w.

Any window function w defining a limited interval may be used.

An example of window function w is the Hann window with a length Nw, and defined by:

$$w(n) = \frac{1}{2}\left[1 - \cos\left(\frac{2\pi n}{N_w}\right)\right]1_{0 \leq n \leq N_w}.$$

Other window functions may be used for example: a rectangular window function, a Hamming window function, a Tukey window function, a cosine window function, a Lanczos window function, a triangular window function, a Gaussian window function, a Bartlett-Hann window function, a Blackman window function, a Kaiser window function, a Nuttall window function, a Blackman-Harris window function, a Blackman-Nuttall window function, a flat top window function, a Bessel window function, a Dolph-Chebyshev window function, a Hann-Poisson window function, an Exponential window function, a Rife-Vincent window function, a DPSS or Slepian window function.

Steps S30 and S40, that will be described below, are configured to advantageously perform a compilation step in a homomorphic encryption environment.

Examples of schemes that can be used for the compilation comprise the fast fully homomorphic encryption scheme over the torus (TFHE) (described in "TFHE: Fast Fully Homomorphic Encryption over the Torus, Chillotti et al., Cryptology ePrint Archive, 2018) and its Concrete implementation (Concrete: TFHE Compiler that converts python programs into FHE equivalent. https://github.com/zama-ai/concrete. 2022), or the Cheon-Kim-Kim-Song (CKKS) scheme (described in "Homomorphic Encryption for Arithmetic of Approximate Numbers", Cheon et al., ISBN: 978-3-319-7° 693-1, November 2017, pp. 409-437).

TFHE and CKKS both represent numbers as integers to perform computations on encrypted data. To compile a given function f to an equivalent FHE circuit $\hat{f}$, Concrete computes look-up tables which store all possible intermediate values in computing $\hat{f}$ as integers rather than floating-point values. Concrete also enforces a 16-bit limit over all intermediate values of the circuit in order to keep the FHE execution speed low.

FHE constraints of representing numbers as low-bit integers entail the use of quantization methods which turn high-bit float values into low-bit integers.

Quantization on a number of B bits associates each element of a continuous or large set (for example, a subset of $\mathbb{R}$) to a smaller, discrete set of size $2^B-1$ (for example $[\![0, 2^B-1]\!]$). In other words, quantization refers to the process of mapping input values from a large set to output values in a smaller set with a finite number of elements.

In a step S30, the encrypted raw audio signal E(x) is quantized so as to obtain a quantized input signal $\widetilde{E(x)}$..

For instance, a range-based, affine, uniform quantization may be used. Let $[\alpha, \beta]$ be the real range of values represented by floats in the input data, and $[\![0, 2^B-1]\!]$ the quantized range. Each float value y is mapped to a quantized value $\tilde{y}$ in $[\![0, 2^B-1]\!]$ defined by:

$$\tilde{y} = (y-\alpha)\frac{2^B-1}{\beta-\alpha}$$

Figure 4:
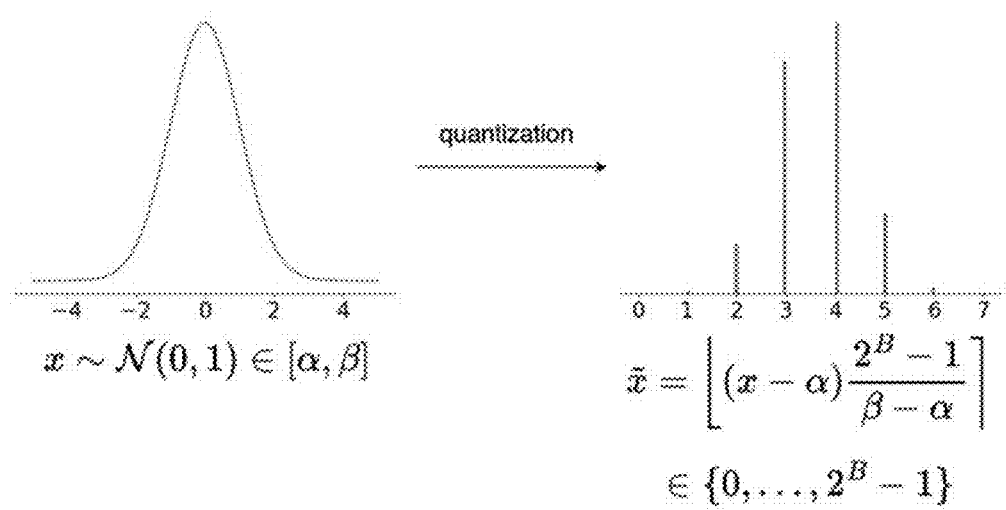
FIG. 4 illustrates an example of a quantization process on a function.

FIG. 4 shows an example of a quantization application of a range-based, affine, uniform quantization to a function, where B is equal to 3. The input signal x is the normal distribution evaluated in a range $[\alpha, \beta]$ and represented on the left hand side. The right hand side shows the corresponding quantized signal $\tilde{x}$, equal to $$\tilde{x} = (x-\alpha)\frac{2^B-1}{\beta-\alpha}$$

and taking values in $[\![0, 2^3-1]\!]$.

In a step S40, for each convolution kernel function $Ke^{m,k}(n)$ among the at least one convolution kernel function, the corresponding weights $Ke^{m,k}(n)$ are quantized, and, so as to generate at least one quantized kernel function $\widetilde{Ke(m,k)}$..

By quantized kernel function, it is meant a kernel function comprising quantized weights. In one example, a range-based affine, uniform quantization may be used.

In a step S50, the at least one quantized convolution kernel function $\widetilde{Ke^{m,k}}$ is compiled in a homomorphic encryption environment so as to obtain a private quantized kernel function $\widetilde{\widetilde{Ke(m,k)}}$..

In a step S60, each quantized kernel function $\widetilde{\widetilde{Ke(m,k)}}$ among the at least one quantized kernel function is applied to the quantized input signal $\widetilde{E(x)}$ so as to determine an encrypted frequency content S(m,k). The weights of each quantized kernel function $\widetilde{\widetilde{Ke(m,k)}}$ are defined such that the application of one quantized kernel function $\widetilde{\widetilde{Ke(m,k)}}$ to the quantized input signal $\widetilde{E(x)}$ provides as a result one Fourier transform at the frequency bin k of a portion of the quantized input signal $\widetilde{E(x)}$ corresponding to a temporal window comprising the temporal bin m (i.e., one Fourier transform for each couple of temporal bin m and frequency bin k).

In the example where the weights are defined by $w(n-mh)e^{-2i\pi kn/N}$, the corresponding result is given by:

$$S(m,k) = \sum_{n=0}^{M-1} \widetilde{E(n)} w(n-mh) e^{-2i\pi kn}/N.$$

With this definition for the weights, the result provided by the application of the convolution kernel function $Ke^{m,k}(n)$ to an input signal is the Fourier transform of this input signal for the couple (m,k), using the window function w.

More specifically, with this definition of the weights, the result provided is a Fourier transform at the frequency bin k of a portion of the quantized input signal corresponding to a temporal window w comprising the time bin mh. In other words, the result is a short-time Fourier transform of the quantized input signal for the couple (m,k) using the window function w.

By varying the temporal bin m, in other words, by sliding the window function w over the encrypted signal $\widetilde{E(x)}$ along the temporal direction, a temporal slice of the short-time Fourier transform for the frequency bin k may be obtained.

By varying the frequency bin k from 0 to the maximum frequency bin, a two-dimensional short-time Fourier transform of the quantized input signal $\widetilde{E(x)}$ is obtained. In other words, by varying the frequency bin k, as the time bin m also varies, the application of the convolution kernels $Ke^{m,k}(n)$ to the quantized input signal $\widetilde{E(x)}$ provides an encrypted frequency content S(m,k) comprising a plurality of Fourier transform values of the quantized input signal for given couples of time bin m and frequency bin k, that can be represented on a two-dimensional plot, with axes the temporal dimension and the frequency dimension.

A definition of the short-time Fourier transform of a signal x(t) is given by:

$$STFT\{x(t)\}(\tau, \omega) = \int_{\infty}^{\infty} x(t)w(t-\tau)e^{-i\omega t}dt,$$

with w a window function, τ a time instant, and ω a frequency.

The application of convolution kernel functions to an input signal can be performed in hardware by the implementation of a neural network with weights corresponding to the weights of the convolution kernel functions. Therefore, the method according to this disclosure may advantageously leverage the use of a implementation based on neural networks with fixed weights.

In some embodiments, the modulus of the encrypted frequency content S(m,k) is computed.

For the modulus of the encrypted frequency content, the computation with a usual method of the square of the real and imaginary parts of the frequency content is costly: in the worst-case scenario, the number of bits needed to represent the output is twice the number of bits used for the inputs.

One advantageous workaround used in the present disclosure is to approximate the spectral density by replacing the modulus square $|X|^2$ with the $l_1$-norm of X, defined by:

$$|X|_{l_1} = |\mathcal{R}(X)| + |\mathfrak{I}(X)|.$$

This only leads to one additional bit to represent the output in the worst-case scenario.

Figure 5:
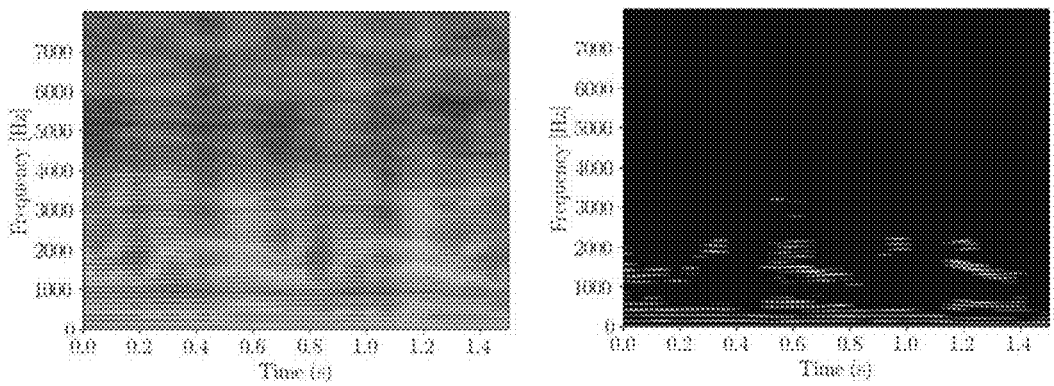
FIG. 5 represents an example of a short time Fourier transform of an encrypted audio signal obtained with the method for determining a frequency content of an encrypted raw audio signal according to the invention, and the short time Fourier transform of the corresponding clear audio signal.

FIG. 5 shows an example of the $l_1$-norm of the frequency content obtained for a raw audio signal extracted from the Vocalset dataset. The frequency content may be represented in two-dimensions, with for instance the temporal dimension along one axis and the frequency dimensions along the other axis. Qualitatively, although the harmonics are lost above 4000 Hz, some of the patterns in lower frequencies are preserved in the spectrogram.

In a step S70, an inverse decryption function $E^{-1}$ of the encryption function E is applied to the encrypted frequency content S(m,k) (or the modulus of the encrypted frequency content S(x)), so as to obtain the frequency content $E^{-1}$(S(m, k)).

For instance, referring to FIG. 2 that illustrates a possible configuration for homomorphic encryption, while steps S10 to S60 may be performed by a server such as the device 20, step S70 may be performed at a client side.

Figure 6:
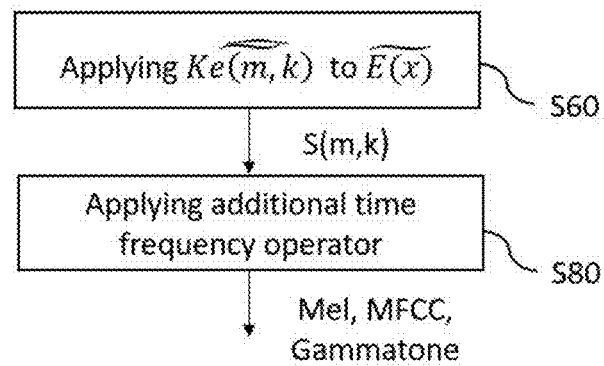
FIG. 6 is an example of a flow-chart representing some steps of a method for determining a frequency content of an encrypted raw audio signal obtained from a preliminary application of an encryption function to a raw audio signal according to some embodiments.

In some embodiments, the method 100 further comprises applying S80 an additional time-frequency operator to the encrypted frequency content S(m,k). FIG. 6 shows schematically step S80.

In one example, the method 100 further comprises applying a set of Mel filter banks to the encrypted frequency content S(m,k). Mel filter banks are compact frequency representations that are closer to human hearing and sensitivity. A Mel filter of order k $H_k(f)$ function of a frequency f, applied to a power spectrogram $|S(m,f)|^2$, where m is a time step, provides a Mel filter bank energy defined by:

$$M(m, k) = \sum_{f=1}^{F} |S(m, f)|^2 H_k(f),$$

with F being the total number of frequency bins.

In another example, the method 100 further comprises a step of applying MFCC to the encrypted frequency content S(m,k) or to the result of the application of Mel filter banks to the encrypted frequency content S(m,k). MFCC is a frequency representation which is closer to human hearing and sensitivity and which is decorrelated.

In another example, the method 100 further comprises a step of applying a gammatone filterbank to the encrypted frequency content S(x). A gammatone filterbank is another frequency representation which is closer to human hearing and sensitivity. More in details, a Gammatone filter is a linear filter described by an impulse response that is the product of a gamma distribution and a sinusoidal tone. The general expression of the gammatone filter of order n is given by:

$$g(t) = a\, t^{n-1} \cos(2\pi f_c t + \varphi)\exp(-2\pi bt),$$

with a the amplitude, t the time, fc the center frequency in Hz, b the filter bandwidth in Hz, and φ the phase of the carrier in radians.

Figure 7:
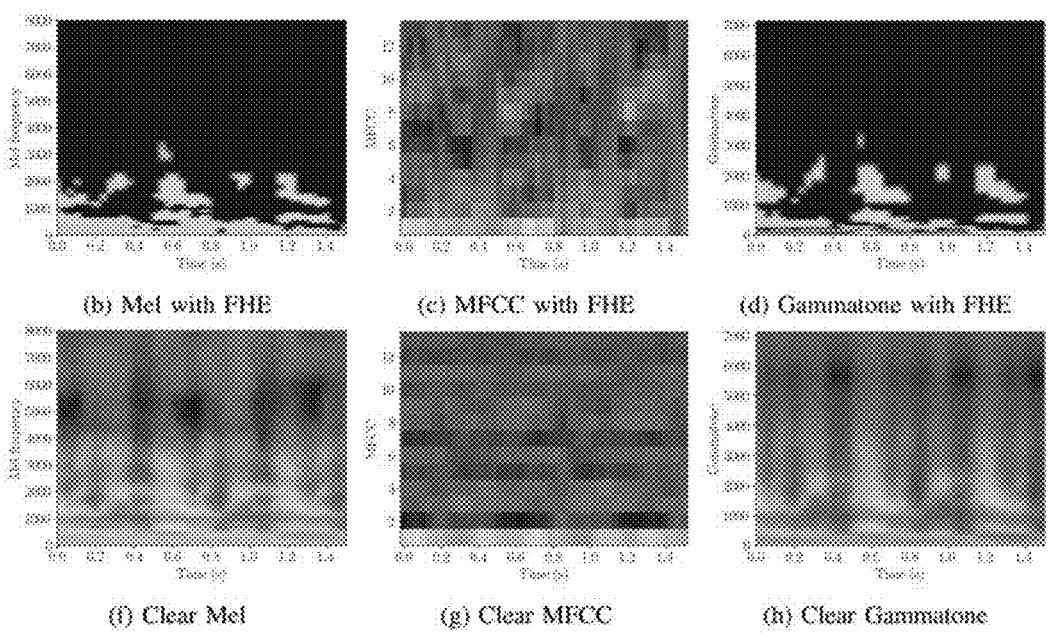
FIG. 7 represents examples of a Mel scale two-dimensional representation, of an MFCC two-dimensional representation and of a Gammatone two-dimensional representation obtained with the method according to the invention from the short time Fourier transform of the encrypted audio signal of FIG. 5, and their counterparts obtained from the clear short time Fourier transform of FIG. 5.

FIG. 7 shows at the top, an example of the frequency contents obtained from the steps of applying a set of Mel filter banks, computing MFCC coefficients and applying a gammatone filterbank to the encrypted frequency content S(m,k), and at the bottom the corresponding spectrograms computed from the raw audio signal x (clear data x). In this example the input signal is a raw audio signal extracted from the Vocalset dataset. Qualitatively, although the harmonics are lost above 4000 Hz, some of the patterns in lower frequencies are preserved in the spectrograms which advantageously allows additional computations.

Figure 8:
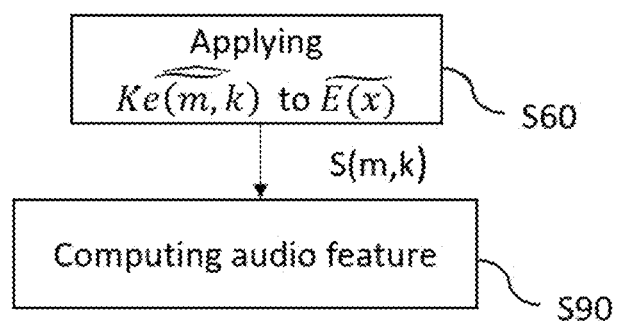
FIG. 8 is an example of a flow-chart representing some steps of a method for determining a frequency content of an encrypted raw audio signal obtained from a preliminary application of an encryption function to a raw audio signal according to some embodiments, comprising the computation of an audio descriptor.
Figure 9:
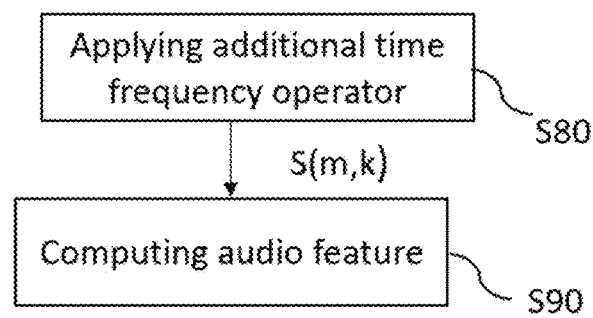
FIG. 9 is another example of a flow-chart representing some steps of a method for determining a frequency content of an encrypted raw audio signal obtained from a preliminary application of an encryption function to a raw audio signal according to some embodiments, comprising the computation of an audio descriptor.

In some embodiments, the method 100 further comprises a step S90 of computing an audio descriptor based on the frequency content. The audio descriptor (e.g., audio feature) is meant to provide with statistics about the encrypted frequency content S(m,k). FIG. 8 and FIG. 9 show two embodiments where step S90 may be carried out. On FIG. 8, step S90 is executed based on the encrypted frequency content obtained from step S60, in other words, the audio descriptor is computed based on the encrypted frequency content S(m,k). In the illustrative example on FIG. 9, step S90 is executed based on the result of the application of an additional time-frequency operator at step S80.

Advantageously, the audio descriptor is a statistical moment of the encrypted frequency content, for instance a mean, a standard deviation, a sum.

In a first example, the audio feature is the average $\mu_\sigma$ of the standard deviation over time of the energy for each frequency bin, for Mel or Gammatone features:

$$\mu_\sigma = \frac{1}{K}\sum_{k=1}^{K}\sqrt{\frac{1}{M}\sum_{m=1}^{M}\left(X(m, k) - \frac{1}{M}\sum_{m'=1}^{M} X(m', k)\right)^2},$$

where m and m' are time bins, k is the frequency bin and where X denotes the power spectrum to process, namely, the encrypted frequency content S(m,k).

For instance, these audio features quantify potential source disturbances in vowels.

In a second example, the audio descriptor is the mean overtime $\mu_{RMS}$ of the root-mean-square (RMS) values, computed over the STFT spectrogram.

$$\mu_{RMS} = \frac{1}{M}\sum_{m=1}^{M} \text{RMS}(m) = \frac{1}{m}\sum_{m=1}^{M}\sqrt{\frac{1}{K}\sum_{k=1}^{K} X(m, k)^2},$$

where m is a time bin, k is the frequency bin.

In a third example the audio descriptor is the standard deviation over time $\sigma_{RMS}$ of the RMS values, computed over the STFT spectrogram.

$$\sigma_{RMS} = \sqrt{\frac{1}{m}\sum_{m=1}^{M}(RMS(m) - \mu_{RMS})^2},$$

where m is a time bin, k is the frequency bin.

In some embodiments, the method 100 further comprises the following steps:
- obtaining (S100) a previously trained model configured for classification of audio signals into one class among a plurality of classes,
- passing (S110) said encrypted frequency spectrum S(m,k) through said previous trained model so as to obtain a class of said frequency spectrum.

Figure 10:
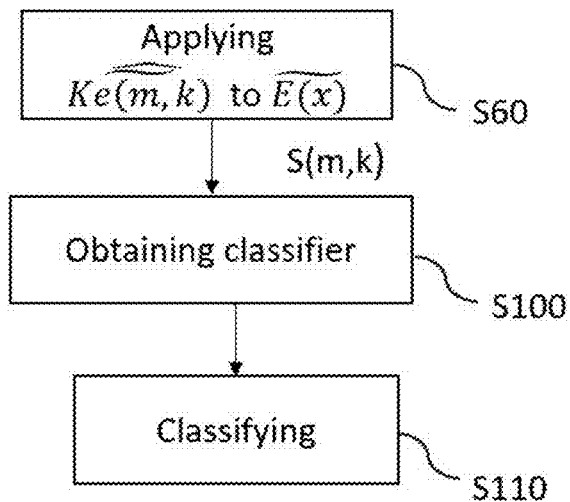
FIG. 10 is an example of a flow-chart representing some steps of a method for determining a frequency content of an encrypted raw audio signal obtained from a preliminary application of an encryption function to a raw audio signal according to some embodiments, comprising a classification step.
Figure 11:
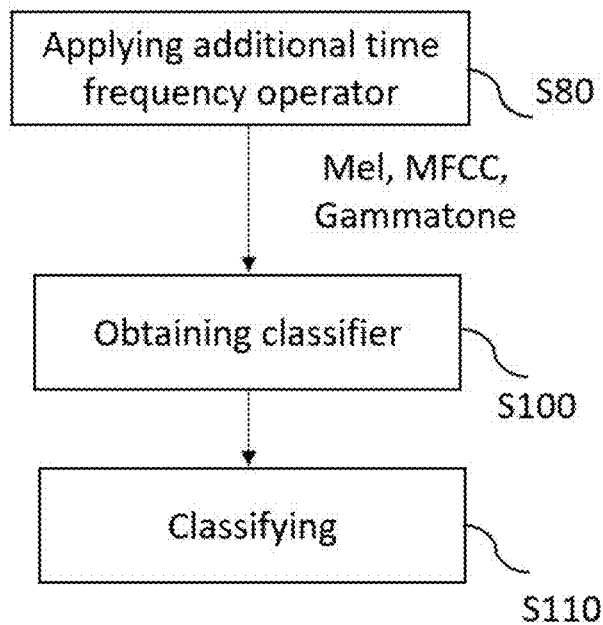
FIG. 11 is another example of a flow-chart representing some steps of a method for determining a frequency content of an encrypted raw audio signal obtained from a preliminary application of an encryption function to a raw audio signal according to some embodiments, comprising a classification step.

FIG. 10 and FIG. 11 shows two embodiments where those steps may be carried out.

In some embodiments, the previously trained model is configured to perform gender classifications.

In some embodiments, the previously trained model is configured to perform vocal exercise classification.

In some embodiments, the method 100 allows for disease classification. More specifically, the previously trained model is configured to perform disease classification. In other words, the method 100 allows diagnosing some diseases such as neuropsychiatric disorders, for instance Alzheimer's disease, depression, schizophrenia, Parkinson's disease, bipolarity.

In some embodiments, the method 100 allows for estimation of symptoms severity and medication posology in the neuropsychiatric disorder diagnosed thanks to the method 100.

In some embodiments, the method 100 allows for estimation from speech of a diversity class of an individual, such as age, gender, socio-economic class.

In some embodiments, the method 100 allows for speaker recognition and identification.

Those embodiments where a previously trained model configured for classification of audio signals is used may advantageously leverage an implementation of the method 100 based on neural networks with fixed weights defined as described above.

The quantization steps S30 and S40 introduce a loss of information. One challenge is to reduce the quantization error as much as possible. The quantization error is defined by the absolute value of the difference between an initial, non-quantized quantity and its quantized version. In one example, if T represents a convolution kernel function or a combination of convolution kernel functions, and g represents an additional time-frequency operator or a previously trained model configured for classification, the quantization error is given by: $|\widetilde{g \circ T}(x) - g \circ T(x)|$.

The inventors of the present disclosure found out that providing approximations of the at least one convolution kernel function $Ke^{m,k}(n)$ advantageously helps to reduce the quantization error. For this, the relationship between the output bit width of a layer of the artificial neural network, the bit width of its inputs and weights in the worst-case scenario was considered.

For a given couple (m,k), applying a convolution kernel function to the input signal amounts to a scalar product between a convolution kernel $w_k$ of size K ($w_1, w_2, \ldots, w_K$) and the input signal x ($x_1, x_2, x_K$). The output y is given by:

$$y = \sum_{k=0}^{K-1} x_k w_k$$

Assuming that all $x_k$ are encoded on N bits and all $w_k$ are encoded on M bits, also assuming the worst-case scenario where every $x_k = 2N-1$ and every $wk = 2M-1$, the number of bits N' needed to encode the output y can be deduced and is given by:

$$N' = \log_2(K(2^N-1)(2^M-1))$$

The inventors got insight from the expression of N' that by reducing K (i.e. introducing zeros in the weights of the convolution kernel function) or reducing N or M (i.e. quantizing more aggressively the input or the kernel weights), the N' value is advantageously decreased and overflow of the accumulator can be avoided. Thus, introducing zeros in the weights of the convolution kernel functions or reducing the number of bits necessary to encode the intermediate values allows to use more bits in the quantization of either the audio inputs or the rest of the kernel functions weights.

In some embodiments, the method 100 further comprises introducing zeros in the weights of at least some of the at least one convolution kernel function $Ke^{m,k}(n)$.

In some embodiments, the method further comprises, at the step S30 of quantizing the encrypted raw audio signal E(x), setting a bit width for the quantization less than a first predefined threshold.

In some embodiments, the method 100 further comprises, at the step S40 of quantizing, for each convolution kernel function $Ke^{m,k}(n)$, setting a bit width for the quantization less than a second predefined threshold.

Further embodiments of the present invention are meant to improve the accuracy of the encrypted frequency content S(m,k), that will be described below. Those embodiments aim at providing an approximation T' of the at least one convolution kernel function $Ke^{m,k}(n)$, therefore reducing the total number of bits to be computed through the implementation of the method 100.

Using an approximation T' rather than the at least one convolution kernel function $Ke^{m,k}(n)$ proves to save unnecessary bit computation in the quantization stage and to allow an increase in bit widths. In the framework of the Concrete implementation of the fast fully homomorphic encryption scheme over the torus (TFHE), the 16-bit integer constraint can also be respected when using such an approximation T'.

In some embodiments referred to as dilation embodiments, the method 100 further comprises S120, for each convolution kernel function, keeping every d fixed weight, where d is an integer higher or equal to 1, and setting other fixed weights of said corresponding kernel to zero. In other words, samples of the quantized input signal $\widetilde{E(x)}$ are skipped at a chosen rate d and one sample is used every d samples.

The rate d can be optimized with respect to the Shannon-Nyquist theorem, that imposes a sampling limit. Relative to the upper frequency $f_k$ of the k-th frequency bin, this limit is given by a frequency-dependent value dk defined by:

$$d_k = \left[\frac{f_s}{2f_k}\right] = \frac{N}{2(k+1)f_s}f_s = \frac{N}{2(k+1)}.$$

The corresponding result of the application of this approximation to a given convolution kernel function for the couple (m,k) to an input signal x can be written as:

$$X^{(d)}(m, k) = \sum_{n=0}^{M-1} x(n)w(n - mh)e^{-2i\pi\frac{kn}{N}} 1_{n \equiv 0[\min(d,d_k)]},$$

which means that only weights of index n proportional to the minimum between a rate d and the value $d_k$ defined by the Shannon-Nyquist theorem are kept in the sum determining the value $X^{(d)}(m,k)$.

To obtain a maximal frequency-dependent dilation, the dilatation rate d may be chosen equal to $d_k$, corresponding to the frequency bin k:

$$X^{(dil)}(m, k) = \sum_{n=0}^{M-1} x(n)w(n - mh)e^{-2i\pi\frac{kn}{N}} 1_{n \equiv 0[d_k]}.$$

The corresponding errors with respect to the exact outputs are respectively given by:

$$|X(m, k) - X^{(d)}(m, k)| = \left|\sum_{n=0}^{M-1} x(n)w(n - mh)e^{-2i\pi\frac{kn}{N}} 1_{n \not\equiv 0[\min(d,d_k)]}\right|, \text{ and}$$

$$|X(m, k) - X^{(d)}(m, k)| = \left|\sum_{n=0}^{M-1} x(n)w(n - mh)e^{-2i\pi\frac{kn}{N}} 1_{n \not\equiv 0[dk]}\right|.$$

It can be seen that when d increases, more noise from other frequency bins is injected. This is especially the case for lower frequencies as they correspond to a higher maximum dilation rate $d_k$.

In some embodiments referred to as frequency-adapted windows embodiments, for each convolution kernel function $Ke^{m,k}(n)$ corresponding to a couple of a time bin m and a frequency bin k, the window function w has a length depending on the frequency bin k. This is different from the conventional short-time Fourier transform, for which a uniform window is applied across all frequency bins. More specifically, the length of the window function w is made dependent on the frequency as follows:

$$N(k) = \min\left(N_w, N_{min}\frac{f_{max}}{f_k}\right)$$

with $f_{max}$ the maximum frequency of the frequency content, $N_w$ the highest window width and $N_{min}$ the smallest window width. It can be seen that at the lowest frequencies, the window width is equal to $N_w$ and at the highest frequency, it is equal to $N_{min}$.

The corresponding result of the application S130 of this approximation to a given convolution kernel function for the couple (m,k) to an input signal x can be written as:

$$X^{(d)}(m, k) = \sum_{n=0}^{M-1} x(n)w_k(n - mh)e^{-2i\pi\frac{kn}{N}}$$

with $w_k(n) = \frac{1}{2}\left(1 - \cos\left(\frac{2\pi n}{N(k) - 1}\right)\right) 1_{\frac{N_w - N(k)}{2} \leq n \leq \frac{N_w + N(k)}{2}}$ The corresponding error with respect to the exact output is given by:

$$|X(m, k) - X^{(d)}(m, k)| = \left|\sum_{n=0}^{M-1} x(n)e^{-2i\pi\frac{kn}{N}}[w(n - mh) - w_k(n - mh)]\right|,$$

where $w(n - mh) - w_k(n - mh) =$ $$\begin{cases} \frac{1}{2}\left(\cos\frac{2\pi n}{N_w - 1} - \cos\frac{2\pi n}{N(k) - 1}\right) & \text{if } \frac{N_w - N(k)}{2} \leq n \leq \frac{N_w + N(k)}{2} \\ -w(n - mh) & \text{otherwise} \end{cases}$$

This error formulation distinguishes two types of approximation errors: the padding error $-w(n-mh)$ due to the added zeros in order to keep a consistent frame length, and the narrowing error $$\frac{1}{2}\left(\cos\frac{2\pi n}{N_w - 1} - \cos\frac{2\pi n}{N(k) - 1}\right)$$

due to the narrower window functions, which increase resolution in time but decrease resolution in frequency due to the time-frequency tradeoff. The intuition of the inventors is that the windows only get narrow at high frequencies, and the loss of resolution is not too drastic.

In some embodiments referred to as Poorman's embodiments, the periodic function is a projection of the complex exponential function onto an ensemble A of L equidistant numbers on the unit circle, where L is an integer. For instance, A can correspond to the set $U_L$ equal to $$\left\{e^{-2i\pi\frac{l}{L}}, l < L\right\}.$$

Starting from the initial definition of the weights $$e^{-2i\pi\frac{kn}{N}}$$

and denoting $p_L$ the projection from the unit circle to $U_L$, the corresponding result of the application S140 of this approximation to a given convolution kernel function for the couple (m,k) to an input signal x is given by:

$$X^L(m, k) = \sum_{n=0}^{M-1} x(n)w(n - mh)p_L\left(e^{-2i\pi\frac{kn}{N}}\right).$$

In those embodiments, the frequency granularity is further reduced. This approach is referred to as Poorman's transform approach.

The corresponding error with respect to the exact frequency content X(m, k) can be shown to be majorated by an upper bound in the following manner:

$$|X(m, k) - X^L(m, k)| \leq 2\left|\sin\frac{\pi}{2L}\right| \sqrt{\sum_{i=0}^{M-1} (x(i)w(i - mh))^2}$$

The upper bound, corresponding to the right-hand side, is independent on k, such that its limit, when the number L of elements of the set $U_L$ increases, tends to zero.

In some embodiments referred to as cropping embodiments, the method 100 further comprises S150 setting weights to zero for frequencies outside a frequency range [$f_{min}$, $f_{max}$], with $f_{min}$, $f_{max}$ hyperparameters to choose. For instance, $f_{min}$ may be set to 0 and $f_{max}$ can be set to 1000 Hz. Those values advantageously define a working frequency range suitable for processing raw audio signals comprising human voices.

The corresponding error for a given time bin m and a given frequency bin k is given by: $|X(m,k)|\{1_{f_k>f_{max}}+1_{f_k<f_{min}}\}$.

Figure 12:
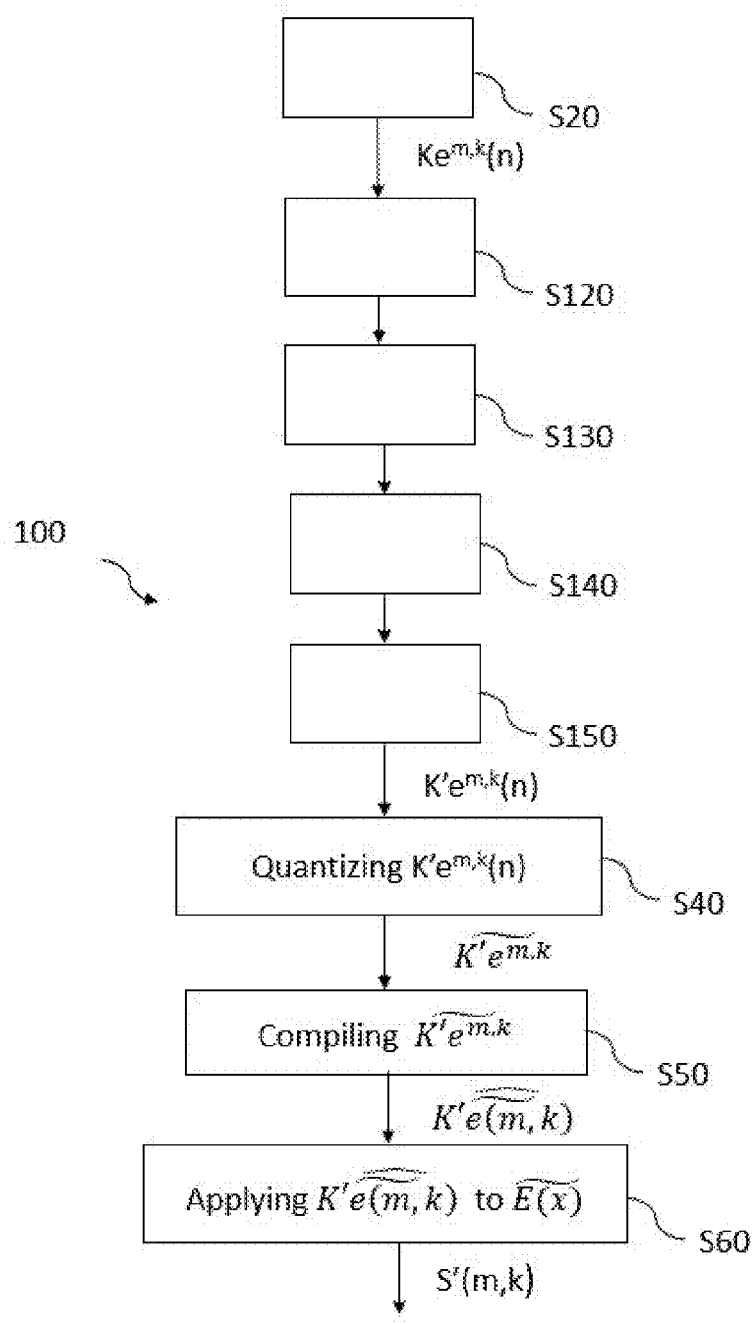
FIG. 12 is an example of a flow-chart representing some steps of a method for determining a frequency content of an encrypted raw audio signal obtained from a preliminary application of an encryption function to a raw audio signal according to some embodiments, comprising approximation steps.

Steps S120, S130, S140 and S150 are approximations steps that produce together approximations $\widetilde{K'e}^{m,k}(n)$ of the at least one convolutional kernel function and that can be carried out before step S40 of quantization and are illustrated on FIG. 12.

In some embodiments, only one or a subset of the approximations corresponding to steps S120, S130, S140 and S150 can be carried out to produce an effective approximation of the at least one convolutional kernel function.

Quantification Optimization

For a given approximation T', the best bit width parameters Bi, Bo, Bw and Bm may be selected with the Pearson correlation coefficient(s) between the outputs of the FHE and clear descriptors with a grid search.

In some embodiments, the method 100 further comprises, before compiling (S50) the at least one quantized convolution kernel function $\widetilde{Ke(m,k)}$:.

obtaining an effective bit budget from the step of quantizing (S30) the encrypted raw audio signal E(x) and the step of quantizing (S40) the K weights;

comparing the effective bit budget to a target bit budget;

if the effective bit budget exceeds said target bit budget, reiterating the step of quantizing (S30) the encrypted raw audio signal E(x) and the step of quantizing (S40) the K weights until the effective bit budget is less or equal to the target bit budget.

In an example, four parameters $B_i$, $B_w$, $B_m$ and $B_o$ are optimized in a grid search.

More specifically, the parameter $B_i$ corresponds to the bit width with which the encrypted signal E(x) is quantized.

More specifically, the parameter $B_w$ corresponds to the bit width with which the weights of the at least one convolution kernel function are quantized.

More specifically, the parameter $B_m$ corresponds to the bit width with which the real part and the imaginary part of the result of the application of the at least one convolutional kernel function are quantized.

More specifically, the parameter $B_o$ corresponds to the bit width with which the $l_1$-norm of the frequency content is quantized.

A first example of criterion for the grid search is to obtain the lowest distance to clear spectrogram (i.e., when the clear signal x is processed by the at least one convolution kernel function).

A second example of criterion for the grid search is to obtain the highest correlation with the clear audio feature or the clear classifier.

The method 100 may advantageously leverage an implementation based on neural networks modeling the convolution kernel functions described above, with fixed weights, so as to facilitate the bit width optimization to fulfill a target bit budget as described above.

EXAMPLES

The present invention is further illustrated by the following examples. More specifically, the following examples will show how the method 100 previously presented can be practically implemented and how the frequency content determined by the method 100 may be further used for audio signals analysis.

The method 100 previously described was implemented on two real-world audio datasets: VocalSet and OxVoc Sounds databases.

The VocalSet database consists of 10 hours of 11 male and 9 female professional singers performing 4 vocal exercises each with different variations. Gender classes and vocal exercise classes (arpeggios, scales, long tones and song excerpts) were considered for the classification task. For replication of statistical tests with audio descriptors, more fine-grained classes were considered: statistical tests were performed over all pairs of variations inside each vocal exercise, which amounts to 144 pairs of audio classes (See Annex for full list of variations for all 4 vocal exercises).

The OxVoc Sounds database consists of 173 spontaneous non-verbal vocal sounds from infants, adults and domestic animals. Human sounds comprise natural expressions of happy, neutral and sad emotions. For adults, sounds are further subdivided by the gender of the speaker. This dataset was not considered for the CNN classification task, as its size is not sufficient. For the task of replicating statistical tests with audio descriptors, pairs of gender categories in each adult emotion class considered, pairs of overall speaker categories (infant, adult or animal), and speaker subcategories (happy, sad and neutral for humans, cats and dogs for animals), which amount to 27 pairs of audio classes.

For computing FHE spectrograms and audio descriptors, each dataset was split into calibration and evaluation sets by selecting 10% of the dataset for calibration and the remaining 90% for evaluation. Stratified sampling was used to make sure the class proportions remained consistent with those of the entire dataset. For classification, stratified sampling was also used to split the VocalSet dataset into train and test sets, using 80% of the data to train and 20% to test.

The results are presented in increasing order of interest towards recent audio processing tasks. First, intrinsic metrics over FHE spectrograms are examined. Then, the statistical properties of FHE audio descriptors are examined, meaning that the compiled FHE model outputs not only one audio descriptor but a vector composed of all audio descriptors. This necessitated a deeper FHE circuit and put harsher constraints on the quantization of the model. Finally, classifiers were built and evaluated to output classes directly from private audio.

Example 1: Intrinsic Metric Results

Table I shows the means, standard deviations and ranges of the average 2D Euclidean distance between the normalized clear and FHE spectrograms for each dataset.

Table 1: 2D Euclidean distances including mean±standard deviation and range for both the VocalSet and the OxVoc Sounds datasets, between normalized clear and FHE spectrograms.

| Audio feature | VocalSet | | Ox Voc | |
|---|---|---|---|---|
| | Mean ± Std | Range | Mean ± Std | Range |
| STFT | 0.13 ± 0.14 | [0.00, 1.38] | 0.13 ± 0.17 | [0.02, 1.37] |
| Mel | 0.18 ± 0.19 | [0.00, 1.38] | 0.13 ± 0.16 | [0.02, 1.21] |
| MFCC | 0.78 ± 0.16 | [0.31, 1.45] | 0.85 ± 0.17 | [0.41, 1.53] |
| GammaT | 0.18 ± 0.19 | [0.01, 1.41] | 0.15 ± 0.19 | [0.03, 1.21] |

As shown qualitatively in FIG. 5 and FIG. 7, the MFCC time frequency representation suffered the most from the quantization necessary to compile the model, as it showed the highest 2D Euclidean mean distance on both datasets. On the other hand, the three other audio transformations showed relatively low distances consistent across both datasets.

It can be observed from Table 1 that for STFT, Mel filterbanks and Gammatones, the mean and standard deviation remain low below 20%.

Example 2: FHE Audio Descriptors

Materials and Methods

Computing audio descriptors over spectrograms indicates how much of the spectrogram information necessary to compute the audio descriptor was preserved by FHE. Additionally, it provides a harsher quantization challenge than the previous task, since more operations are performed, on top of time-frequency representations. In this example, the mean of standard deviations for Mel filterbanks and Gammatones was computed, quantifying potential source disturbances in vowels; and RMS statistics were also computed as commonly used in various paralinguistic tasks. The compiled model outputs all 4 audio descriptors in one tensor, so they are required to be quantized with the same parameters. Since the scales of values of the audio descriptors can be different, a normalization step was carried out before concatenation and the common quantization of the descriptors to avoid unnecessary loss of precision. The constants were computed during the calibration process and used at inference time to simulate regular normalization.

Figure 13:
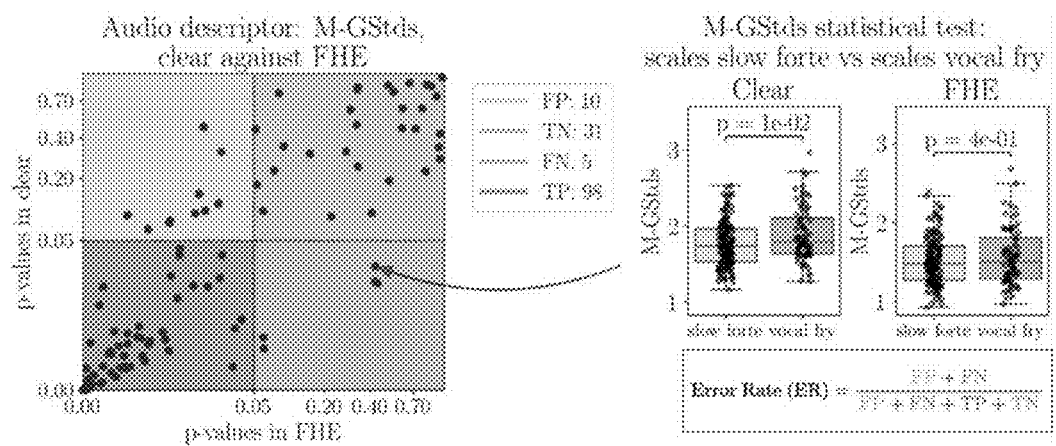
FIG. 13 shows first results relating to the determination of audio descriptors with the method according to the invention.

To compare approximations against each other, an in-depth evaluation of false discovery and missing discovery rates was carried out. The results of statistical tests performed using clear and FHE outputs were compared. Specifically, the audio descriptors for all audio classes in both datasets using both FHE and clear computation were computed. Then, a MannWhitney U test on the audio descriptors from each pair of audio classes in both FHE and clear computation was performed. A high fidelity FHE audio descriptor is expected to yield p-values for these statistical tests that are similar to the p-values obtained with the audio descriptor in clear. A true positive as a pair of audio classes was defined where the FHE computation maintains the statistical test separation ($p<0.05$) observed in the clear computation. Conversely, a false negative occurs when the FHE computation fails to preserve this separation. True negatives and false positives were defined similarly. By calculating the error rate (sum of false discovery and missed discovery) introduced by FHE, the accuracy of the FHE audio descriptors was gauged. FIG. 13 left illustrates this evaluation for a given marker, and a specific comparison of Clear and FHE statistical test is given on FIG. 13 right.

More specifically, FIG. 13 illustrates the results as a scatter plot of p-values computed in clear or in FHE, for the mean of gammatone standard deviations (M-GStds) audio descriptor with the conventional STFT approach (i.e. without approximations), and shows the statistical test results for a false negative example. The data is from VocalSet. The arrow points to statistical tests in clear and FHE for the pair of audio classes ("scales slow forte", "scales vocal fry").

Table II shows the full examination of error rates of the conventional STFT with FHE, in comparison to different approximations according to the present disclosure. The total number and error rates (sum of false positives and false negatives) for the VocalSet Singing dataset and the OxVoc Sounds dataset is displayed.

Table II shows that the conventional STFT approach is making some errors but remain low, as it only lead to mean error rates of 5.9% and 6.5% for VocalSet and OxVoc respectively. Secondly, the Poorman's transform approach improved upon the baseline in both datasets in its original formulation (L=4 quantized angles) by achieving mean error rates of 4.9% and 3.7% for VocalSet and OxVoc respectively. The dilation approach also outperformed the baseline conventional STFT, especially with dilation factor 4 which turned out to be the best approach across both datasets (mean error rates 4.7% and 1.9% for VocalSet and OxVoc respectively). In contrast, other approaches such as cropping, frequency-adapted windows or L1 energy lead to worse results.

Figure 14:
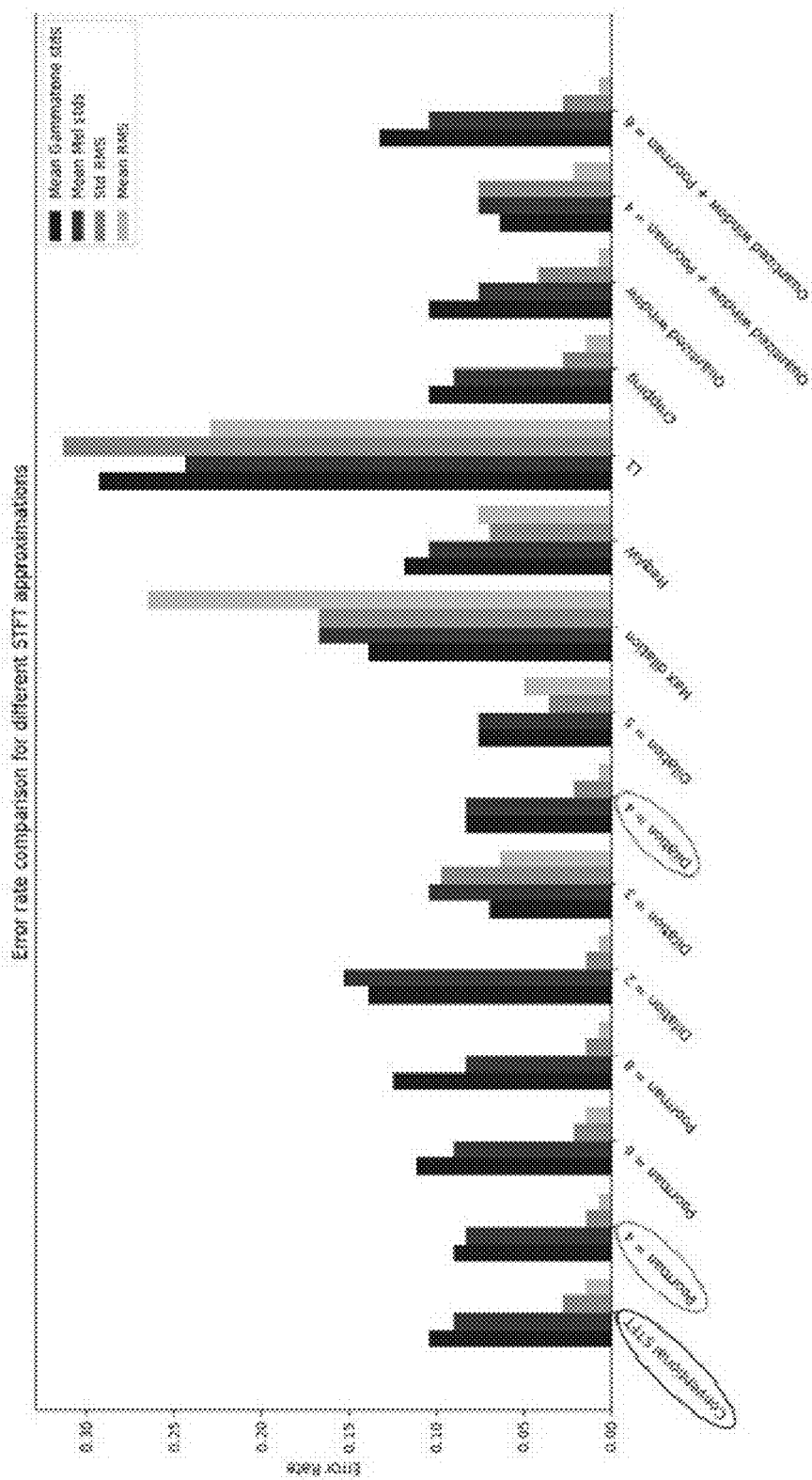
FIG. 14 shows second results relating to the determination of audio descriptors with the method according to the invention.
Figure 15:
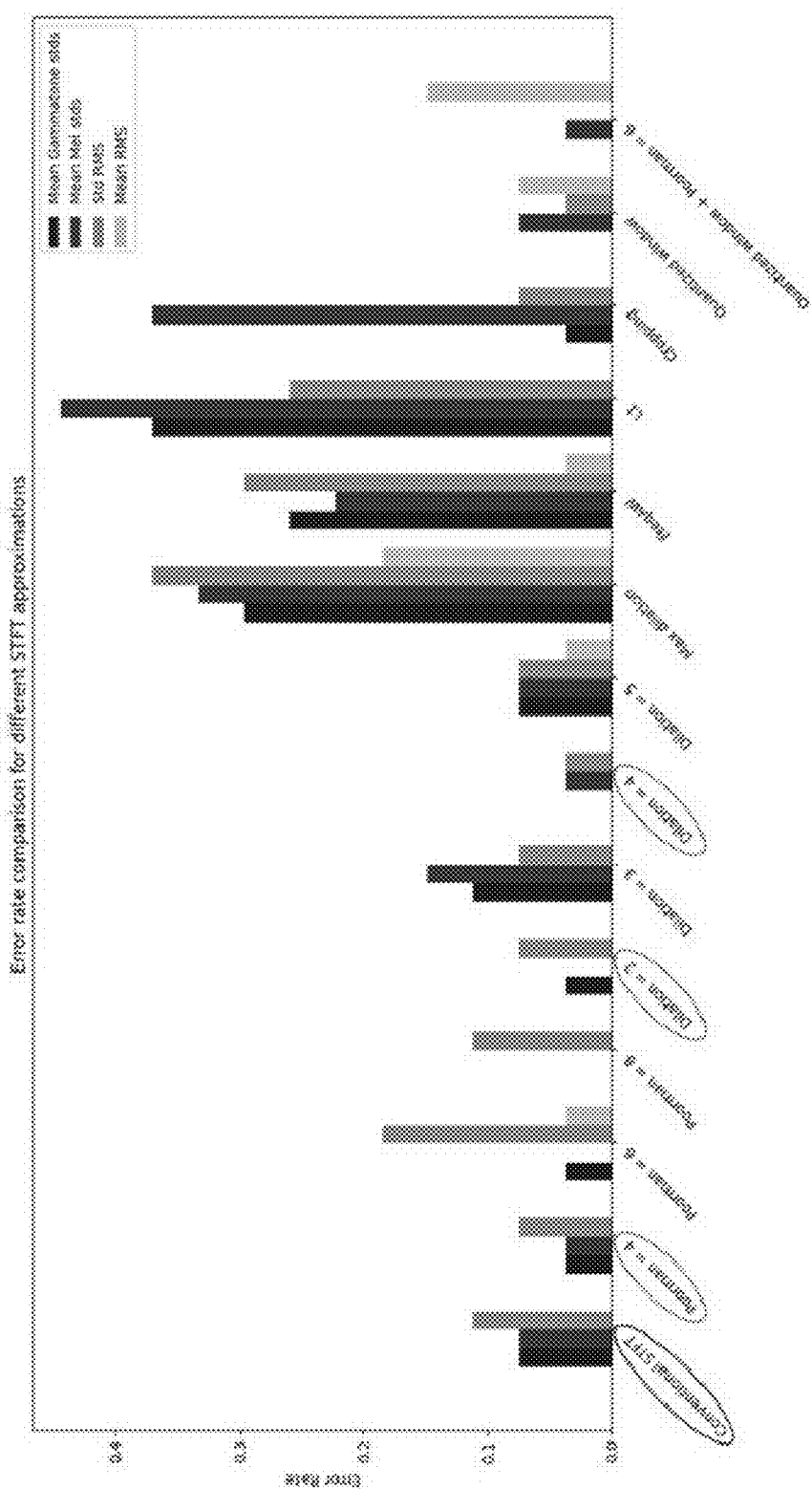
FIG. 15 shows third results relating to the determination of audio descriptors with the method according to the invention.

FIGS. 14 and 15 show in an alternate manner the results of Table II for respectively the VocalSet and the OxVoc set.

Results

Table II: Error rates for statistical tests with FHE audio descriptors on VocalSet and OxVoc Sounds datasets, over different approximations. N is the total number of statistical tests for pairs of audio classes. The absolute sum of false positives and false negatives is in parentheses. The best approach for each marker and dataset is bolded and all approaches matching or outperforming the baseline are underlined in the "Total" column. Cropping was performed with 1 kHz. d=dk stands for choosing the maximum dilation rate dk at each frequency bin k. FreqAW stands for frequency-adapted windows, performed with Nmin=80.

|  | STFT formulation | | | | | |
|---|---|---|---|---|---|---|
|  | Mean Gammatone stds | | Mean Mel stds | | Std RMS | |
|  | VocalSet (n = 144) | Ox Voc (n = 27) | VocalSet (n = 144) | OxVoc (n = 27) | VocalSet (n = 144) | OxVoc (n = 27) |
| Conventional STFT | 10.4 (15) | 7.4 (2) | 9.0 (13) | 7.4 (2) | 2.8 (4) | 11.1 (3) |
| Poorman |  |  |  |  |  |  |
| L = 4 | 9.0 (13) | 3.7 (1) | 8.3 (12) | 3.7 (1) | 1.4 (2) | 7.4 (2) |
| L = 6 | 11.1 (16) | 3.7 (1) | 9.0 (13) | 0.0 (0) | 2.1 (3) | 18.5 (5) |
| L = 8 | 12.5 (18) | 0.0 (0) | 8.3 (12) | 0.0 (0) | 1.4 (2) | 11.1 (3) |
| Dilation |  |  |  |  |  |  |
| d = 2 | 13.9 (20) | 3.7 (1) | 15.3 (22) | 0.0 (0) | 1.4 (2) | 7.4 (2) |
| d = 3 | 6.9 (10) | 11.1 (3) | 10.4 (15) | 14.8 (4) | 9.7 (14) | 7.4 (2) |
| d = 4 | 8.3 (12) | 0.0 (0) | 8.3 (12) | 3.7 (1) | 2.1 (3) | 3.7 (1) |
| d = 5 | 7.6 (11) | 7.4 (2) | 7.6 (11) | 7.4 (2) | 3.5 (5) | 7.4 (2) |
| d = dk | 13.9 (20) | 29.6 (8) | 16.7 (24) | 33.3 (9) | 16.7 (24) | 37.0 (10) |
| FreqAW | 11.8 (17) | 25.9 (7) | 10.4 (15) | 22.2 (6) | 6.9 (10) | 29.6 (8) |
| L1 | 29.2 (42) | 37.0 (10) | 24.3 (35) | 44.4 (12) | 31.3 (45) | 25.9 (7) |
| Cropping | 10.4 (15) | 3.7 (1) | 9.0 (13) | 37.0 (10) | 2.8 (4) | 7.4 (2) |

|  | Mean RMS | | Total | |
| --- | --- | --- | --- | --- |
| STFT formulation | VocalSet (n = 144) | Ox Voc (n = 27) | VocalSet (n = 576) | Ox Voc (n = 108) |
| Conventional STFT | 1.4 (2) | 0.0 (0) | 5.9 (34) | 6.5 (7) |
| Poorman | | | | |
| L = 4 | 0.7 (1) | 0.0 (0) | 4.9 (28) | 3.7 (4) |
| L = 6 | 1.4 (2) | 3.7 (1) | 5.9 (34) | 6.5 (7) |
| L = 8 | 0.7 (1) | 0.0 (0) | 5.7 (33) | 2.8 (3) |
| Dilation | | | | |
| d = 2 | 0.7 (1) | 0.0 (0) | 7.8 (45) | 2.8 (3) |
| d = 3 | 6.3 (9) | 0.0 (0) | 8.3 (48) | 8.3 (9) |
| d = 4 | 0.7 (1) | 0.0 (0) | 4.7 (27) | 1.9 (2) |
| d = 5 | 4.9 (7) | 3.7 (1) | 5.9 (34) | 6.5 (7) |
| d = dk | 26.4 (38) | 18.5 (5) | 18.4 (106) | 29.6 (32) |
| FreqAW | 7.6 (11) | 3.7 (1) | 9.2 (53) | 20.4 (22) |
| L1 | 22.9 (33) | 0.0 (0) | 26.9 (155) | 26.9 (29) |
| Cropping | 1.4 (2) | 0.0 (0) | 5.9 (34) | 12.0 (13) |

Example 3: Classification in FHE

Materials and Methods

Gender and vocal exercise classification were performed on the VocalSet and OxVoc dataset. A convolutional neural network (CNN) was trained to classify audios either in the clear or in FHE, and compared the obtained accuracies. A CNN architecture was used, containing two convolutional blocks with respectively 8 and 16 filters, ReLU activations and batch normalizations, a max-pooling layer and two fully connected layers separated by ReLU activations. A batch size of 32 for gender classification and 16 for vocal exercise classification was used, and an Adam optimizer with a learning rate of 10-3 for 10 to 20 epochs. Quantization-aware training as performed, meaning the quantized network were trained directly instead of performing post-training quantization.

Figure 16:
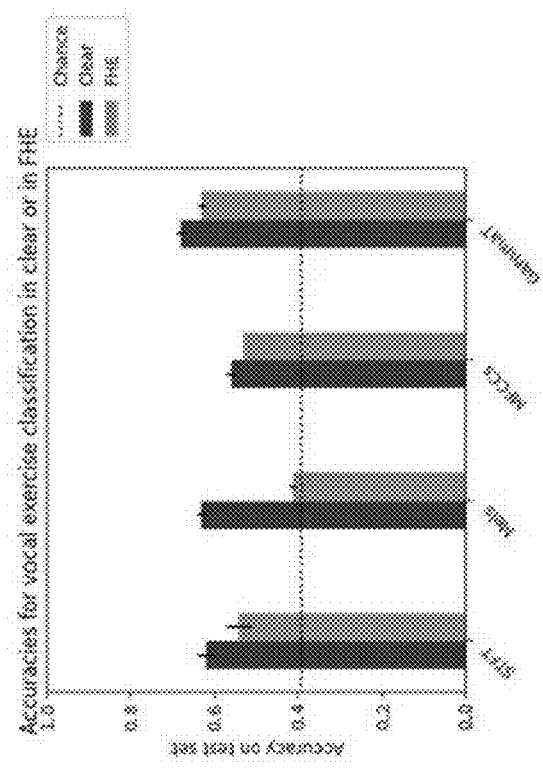
FIG. 16 shows results relating to a classification step of the method according to the invention
Figure 16:
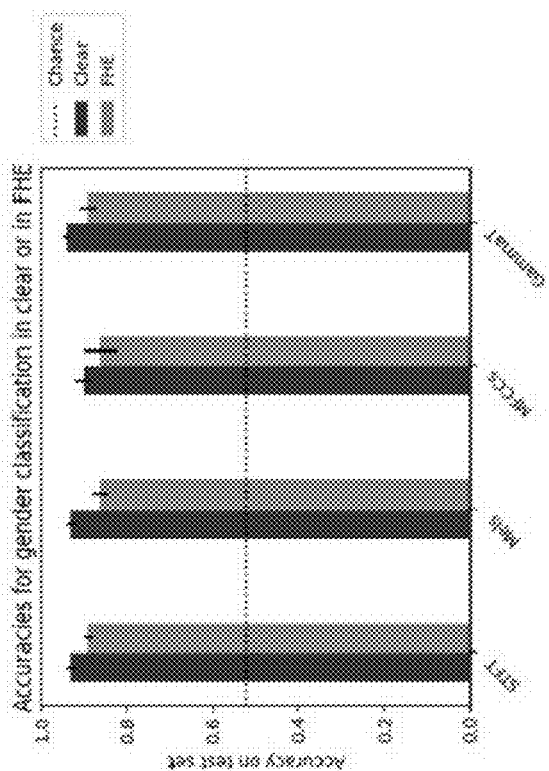

Table III presents the spectrogram-based classification results. FIG. 16 shows in an alternate manner the results of Table III for the VocalSet with the results in clear (left) and the results with fully end-to-end FHE (right).

Results

Table III: Mean and standard deviation of the test set accuracies for binary gender classification and 4-class vocal exercise classification obtained with Clear, FHE, Poorman, or Dilation classifiers, across 5 runs with different seeds. Experiments are done on VocalSet. GammaT stands for Gammatones. The best approach for each audio representation and vocal task is bolded. The "Chance" classifier is a dummy classifier that always predicts the majority class.

|  | Gender classification | | | |
| --- | --- | --- | --- | --- |
| Features | Clear | Conventional | Poorman | Dilation |
| STFT | 0.93 ± 0.01 | 0.89 ± 0.01 | 0.82 ± 0.02 | 0.88 ± 0.01 |
| Mel | 0.93 ± 0.01 | 0.86 ± 0.02 | 0.84 ± 0.01 | 0.82 ± 0.01 |
| MFCC | 0.90 ± 0.02 | 0.86 ± 0.04 | 0.83 ± 0.01 | 0.79 ± 0.01 |
| GammaT | 0.94 ± 0.01 | 0.89 ± 0.02 | 0.83 ± 0.02 | 0.82 ± 0.01 |
| Chance | | 0.52 | | |

|  | Vocal exercise classification | | | |
| --- | --- | --- | --- | --- |
| Features | Clear | Conventional | Poorman | Dilation |
| STFT | 0.62 ± 0.02 | 0.54 ± 0.03 | 0.50 ± 0.04 | 0.59 ± 0.01 |
| Mel | 0.63 ± 0.01 | 0.41 ± 0.01 | 0.42 ± 0.01 | 0.50 ± 0.02 |
| MFCC | 0.56 ± 0.01 | 0.53 ± 0.00 | 0.50 ± 0.01 | 0.54 ± 0.01 |
| GammaT | 0.68 ± 0.01 | 0.63 ± 0.01 | 0.63 ± 0.01 | 0.62 ± 0.02 |
| Chance | | 0.39 | | |

Binary gender classification accuracies in FHE stayed close to the accuracies in clear audio, ranging from 0.86 to 0.89 in FHE compared to 0.90 to 0.94 in clear audio. For the more challenging 4-class vocal exercise classification, the audio representation choice mattered more and our approximations helped to get closer to the clear computation. Dilation for the vocal exercise classification was the best for STFT, mel filterbanks and MFCCs. Therefore, the accuracy of the result of the classification depends on the type of classification and/or the nature of the classifier. Overall though, these results still suggest that FHE time-frequency representations effectively preserve some, if not much of the information needed for both speaker gender and vocal exercise classification. Approximations would be useful for some computational tasks.

Example 4: Post-Hoc Analysis

Figure 17:
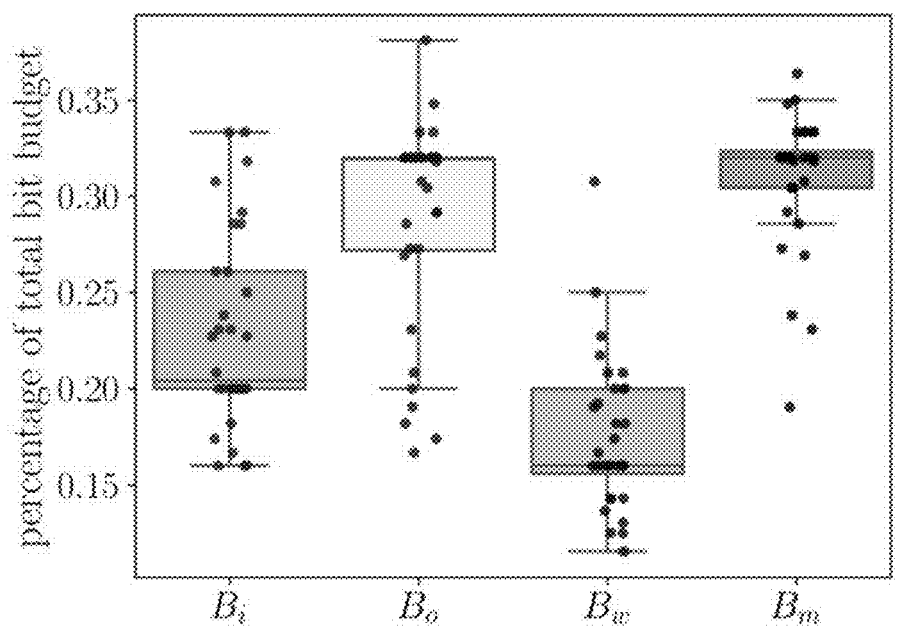
FIG. 17 is a graph showing the distribution of bit width parameters in some best-performing embodiments of the invention.

FIG. 17 shows the distribution of bit width parameters in some best-performing quantized models. On average, convolution weights used significantly lower bit widths, representing only about 15% of the total budget. In contrast, bit widths controlling the output quantization represented more than 35% of the total budget on average. This suggests a heuristic for optimal quantization parameters: choosing higher bit widths on activations and lower bit widths on weights leads to better performances. This aligns with the inventors' observation that the Poorman's transform, an extreme quantization of STFT coefficients, outperformed the baseline, and other approximations.

In this disclosure, the first secure raw audio processing pipeline using fully homomorphic encryption was provided. The validity of the approach was validated across increasingly difficult tasks: first the computation of four standard time-frequency representations, then the computation of four audio descriptors over different representations in one single model, and finally the training of end-to-end privacy-preserving CNN classifiers for both binary and multiclass classification. The performance of FHE audio descriptors and FHE classifiers was further by introducing approximations of time-frequency representations which optimize the quantization of the models.

The invention claimed is:
1. A computer-implemented method for determining a frequency content of an encrypted raw audio signal obtained from a preliminary application of an encryption function E to a raw audio signal, said method comprising:
    obtaining said encrypted raw audio signal;
    obtaining at least one convolution kernel function, each convolution kernel function comprising K weights and corresponding to a couple composed of a temporal bin and a frequency bin;
    quantizing said encrypted raw audio signal, so as to obtain a quantized input signal;

for each convolution kernel function among said at least one convolution kernel function, quantizing said K weights, so as to generate at least one quantized convolution kernel function;

compiling said at least one quantized convolution kernel function in a homomorphic encryption environment so as to obtain at least one private quantized kernel function;

applying said at least one private quantized kernel function to said quantized input signal so as to determine an encrypted frequency content comprising, for each couple of said temporal bin and said frequency bin, a Fourier transform at said frequency bin of a portion of said quantized input signal corresponding to a temporal window comprising said time bin; and applying an inverse decryption function of said encryption function to said encrypted frequency content, so as to obtain said frequency content.

2. The computer-implemented method according to claim 1, further comprising, before compiling said at least one quantized convolution kernel function:

obtaining an effective bit budget from said step of quantizing said encrypted raw audio signal and said step of quantizing said K weights;

comparing said effective bit budget to a target bit budget; and if said effective bit budget exceeds said target bit budget, reiterating said step of quantizing said encrypted raw audio signal and said step of quantizing said K weights until said effective bit budget is less than or equal to said target bit budget.

3. The computer-implemented method according to claim 1, wherein, for each convolution kernel function, each weight is a product of a periodic function of said frequency bin k with a window function of said temporal bin m.

4. The computer-implemented method according to claim 3, wherein, for each couple composed of a temporal bin and a frequency bin, said window function has a length depending said frequency bin.

5. The computer-implemented method according to claim 3, wherein the periodic function is a projection of the complex exponential function on an ensemble of L equidistant numbers on the unit circle, where L is an integer.

6. The computer-implemented method according to claim 3, wherein, for each convolution kernel function, each weight depends on an index n comprised between 0 and K−1, the method further comprising setting weights corresponding to an index n greater than $N_{min}$ and less that $N_{max}$ to zero.

7. The computer-implemented method according to claim 1, further comprising: computing an audio descriptor of said frequency content.

8. The computer-implemented method according to claim 7, wherein said audio descriptor is a statistical moment of said frequency content.

9. The computer-implemented method according to claim 1, further comprising:

obtaining a previously trained model configured for classification of audio signals into one class among a plurality of classes, and passing said encrypted frequency spectrum through said previous trained model so as to obtain a class of said encrypted frequency spectrum.

10. The computer-implemented method according to claim 1, further comprising, for each convolution kernel function, keeping every d weight, where d is an integer higher or equal to 1, and setting other weights to zero.

11. The computer-implemented method according to claim 10, wherein said quantized input signal is a temporal sequence of N audio data, and for each couple composed of a temporal bin and a frequency bin, d is smaller than $$\frac{N}{2(k+1)}.$$

12. The computer-implemented method according to claim 1, wherein said raw audio signal comprises speech data from at least one subject.

13. The computer-implemented method according to claim 1, further comprising applying a Mel filterbank to at least one temporal slice of said encrypted frequency content and corresponding to a given temporal bin so as to obtain at least one MelScale representation.

14. The computer-implemented method according to claim 13, further comprising determining Mel-Frequency Cepstral Coefficients (MFCC) from said at least one MelScale representation.

15. The computer-implemented method according to claim 1, further comprising applying a Gammatone filterbank to said encrypted frequency content.

16. The computer-implemented method according to claim 1, further comprising, based on said encrypted frequency content, determining a presence or an absence of a symptom of a disease.

17. The computer-implemented method according to claim 1, further comprising, based on said encrypted frequency content, determining a severity degree of a disease.

18. A device for determining a frequency content of an encrypted raw audio signal obtained from a preliminary application of an encryption function E to a raw audio signal x, said device comprising:

at least one input configured to:

obtain said encrypted raw audio signal; and obtain at least one convolution kernel function, each convolution kernel function comprising K weights and corresponding to a couple composed of a temporal bin and a frequency bin;

at least one processor configured to:

quantize said encrypted raw audio signal, so as to obtain a quantized input signal;

for each convolution kernel function among said at least one convolution kernel function, quantize said K weights, so as to generate at least one quantized convolution kernel function;

compile said at least one quantized convolution kernel function in a homomorphic encryption environment so as to obtain at least one private quantized kernel function; and apply said at least one private quantized kernel function to said quantized input signal so as to determine an encrypted frequency content comprising, for each couple of said temporal bin m and said frequency bin k, a Fourier transform at said frequency bin k of a portion of said quantized input signal corresponding to a temporal window comprising said time bin m, and at least one output configured to output said encrypted frequency content, wherein said device is configured to implement the method according to claim 1.

19. A non-transitory computer-readable medium encoded with a computer program product comprising instructions which, when the program is executed by a computer, cause the computer to carry out the method according to claim 1.

20. A non-transitory program storage medium, comprising instructions which, when executed by a computer, cause the computer to carry out the method according to claim 1.

* * * * *